(12) United States Patent
Pirwani et al.

(10) Patent No.: US 10,197,409 B2
(45) Date of Patent: Feb. 5, 2019

(54) FREQUENCY BASED TRANSIT TRIP CHARACTERIZATIONS

(71) Applicant: Apple Inc., Cupertino, CA (US)

(72) Inventors: Imran A. Pirwani, Campbell, CA (US); Stanley E. Roberts, San Francisco, CA (US); David Hodge, Mountain View, CA (US); Cameron Sabol, Cupertino, CA (US); Usama M. Hajj, San Francisco, CA (US); Ian Leighton, Kensington, CA (US); Alexander Tesov, Palo Alto, CA (US); Kaspar Fischer, San Francisco, CA (US); Curtis Galloway, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/869,684

(22) Filed: Sep. 29, 2015

(65) Prior Publication Data

US 2016/0358469 A1   Dec. 8, 2016

Related U.S. Application Data

(60) Provisional application No. 62/172,206, filed on Jun. 7, 2015, provisional application No. 62/172,209, filed
(Continued)

(51) Int. Cl.
*G08G 1/123* (2006.01)
*G01C 21/20* (2006.01)
(Continued)

(52) U.S. Cl.
CPC ......... *G01C 21/3423* (2013.01); *G01C 21/20* (2013.01); *G01C 21/3484* (2013.01);
(Continued)

(58) Field of Classification Search
CPC .................................................. G01C 21/3423
See application file for complete search history.

(56) References Cited

U.S. PATENT DOCUMENTS

| 5,177,684 A | 1/1993 | Harker et al. |
| 5,412,573 A | 5/1995 | Barnea et al. |

(Continued)

FOREIGN PATENT DOCUMENTS

| EP | 2733651 A1 | 5/2014 | |
| TW | 201038923 A1 * | 11/2010 | .............. G06Q 10/06 |
| WO | 2015/024807 A1 | 2/2015 | |

OTHER PUBLICATIONS

Nourish, "Google Maps Introduces New, Smarter Transit Routing," May 17, 2013, Seattle Transit Blog, https://www.seattletransitblog.com/2013/05/17/google-maps-introduces-guidebook-routing/.*

(Continued)

*Primary Examiner* — Thomas G Black
*Assistant Examiner* — Sara J Lewandroski
(74) *Attorney, Agent, or Firm* — Invoke

(57) ABSTRACT

Some embodiments provide a map application that identifies a transit route between a starting location and a destination. The transit route, in some embodiments, includes a set of transit legs that each is serviced by transit vehicles of a transit line. The map application of some embodiments, after identifying the transit route, categorizes each transit line of the transit route as one of a high frequency transit line and a low frequency transit line. The map application displays the departure schedules of high frequency transit lines in a first manner, while the map application displays the departure schedules of low frequency transit lines in a second different manner.

22 Claims, 14 Drawing Sheets

Related U.S. Application Data on Jun. 7, 2015, provisional application No. 62/172,214, filed on Jun. 7, 2015, provisional application No. 62/172,216, filed on Jun. 7, 2015.

(51) Int. Cl.

| | | |
|---|---|---|
| *G01C 21/34* | (2006.01) | |
| *G01C 21/36* | (2006.01) | |
| *G06F 3/0484* | (2013.01) | |
| *G06F 3/0485* | (2013.01) | |
| *G06F 3/0488* | (2013.01) | |
| *G08G 1/01* | (2006.01) | |

(52) U.S. Cl.
CPC ......... *G01C 21/36* (2013.01); *G01C 21/3667* (2013.01); *G06F 3/0485* (2013.01); *G06F 3/0488* (2013.01); *G06F 3/04842* (2013.01); *G08G 1/0125* (2013.01); *G08G 1/123* (2013.01)

(56) References Cited

U.S. PATENT DOCUMENTS

| | | | |
|---|---|---|---|
| 5,977,990 A | 11/1999 | Kowalski | |
| 6,249,741 B1 | 6/2001 | Iwasaki et al. | |
| 7,030,781 B2 | 4/2006 | Jones | |
| 7,221,287 B2 | 5/2007 | Gueziec et al. | |
| 7,469,827 B2 | 12/2008 | Katragadda et al. | |
| 7,693,657 B2 | 4/2010 | Endo et al. | |
| 7,746,343 B1 | 6/2010 | Charaniya et al. | |
| 7,818,116 B1 | 10/2010 | Nesbitt | |
| 7,925,427 B2 | 4/2011 | Zehler | |
| 7,933,897 B2 | 4/2011 | Jones et al. | |
| 7,957,871 B1 | 6/2011 | Echeruo | |
| 8,031,206 B2 | 10/2011 | Shoemaker | |
| 8,301,112 B2 | 10/2012 | Morrison | |
| 8,315,801 B2 | 11/2012 | Takagi | |
| 8,489,328 B2 | 7/2013 | Lee | |
| 8,532,851 B2 | 9/2013 | Kondo et al. | |
| 8,588,818 B2 | 11/2013 | Huang et al. | |
| 8,681,176 B1 | 3/2014 | Maurer et al. | |
| 8,825,376 B1 | 9/2014 | Szybalski et al. | |
| 8,972,185 B1 * | 3/2015 | Viger | G01C 21/3423 701/533 |
| 8,972,190 B1 | 3/2015 | Pech et al. | |
| 8,996,304 B2 | 3/2015 | Needham et al. | |
| 8,996,312 B1 | 3/2015 | Freund et al. | |
| 9,043,150 B2 | 5/2015 | Forstall et al. | |
| 9,057,612 B1 * | 6/2015 | Savvopoulos | G01C 21/3423 |
| 9,082,134 B2 * | 7/2015 | Gishen | G06Q 30/0252 |
| 9,171,464 B2 | 10/2015 | Khetan et al. | |
| 9,194,717 B2 | 11/2015 | Jouaux et al. | |
| 9,212,924 B1 | 12/2015 | Salowitz | |
| 9,285,231 B2 | 3/2016 | Jouaux et al. | |
| 9,317,813 B2 | 4/2016 | McGavran et al. | |
| 9,396,508 B2 | 7/2016 | Otero et al. | |
| 9,482,296 B2 | 11/2016 | Lemay et al. | |
| 9,500,494 B2 | 11/2016 | Van et al. | |
| 9,618,344 B2 | 4/2017 | Harrison et al. | |
| 9,940,679 B2 | 4/2018 | Hampson et al. | |
| 2002/0069017 A1 | 6/2002 | Schmier et al. | |
| 2003/0019266 A1 | 1/2003 | Kanno | |
| 2003/0036848 A1 | 2/2003 | Sheha et al. | |
| 2003/0109266 A1 | 6/2003 | Rafiah et al. | |
| 2004/0158395 A1 | 8/2004 | Yamada et al. | |
| 2004/0181337 A1 | 9/2004 | Kawasaki et al. | |
| 2004/0233070 A1 | 11/2004 | Finnern | |
| 2005/0192025 A1 | 9/2005 | Kaplan | |
| 2005/0222760 A1 | 10/2005 | Cabral et al. | |
| 2006/0149461 A1 | 7/2006 | Rowley et al. | |
| 2006/0293847 A1 | 12/2006 | Marriott et al. | |
| 2007/0118520 A1 | 5/2007 | Bliss et al. | |
| 2007/0138347 A1 | 6/2007 | Ehlers | |
| 2007/0150179 A1 | 6/2007 | Pinkus et al. | |
| 2007/0194940 A1 | 8/2007 | Valluru | |
| 2007/0208492 A1 | 9/2007 | Downs et al. | |
| 2007/0208498 A1 | 9/2007 | Barker et al. | |
| 2007/0208502 A1 | 9/2007 | Sakamoto et al. | |
| 2007/0210937 A1 | 9/2007 | Smith et al. | |
| 2008/0068221 A1 | 3/2008 | Park | |
| 2008/0071465 A1 | 3/2008 | Chapman et al. | |
| 2008/0147313 A1 | 6/2008 | Nesbitt | |
| 2008/0238941 A1 | 10/2008 | Kinnan et al. | |
| 2008/0291925 A1 | 11/2008 | Fisher et al. | |
| 2009/0018766 A1 | 1/2009 | Chen et al. | |
| 2009/0063041 A1 | 3/2009 | Hirose et al. | |
| 2009/0063048 A1 | 3/2009 | Tsuji | |
| 2009/0112462 A1 | 4/2009 | Lo | |
| 2009/0119001 A1 * | 5/2009 | Moussaeiff | G01C 21/005 701/532 |
| 2009/0143977 A1 | 6/2009 | Beletski et al. | |
| 2009/0171561 A1 | 7/2009 | Geelen | |
| 2009/0171575 A1 | 7/2009 | Kim et al. | |
| 2009/0216732 A1 | 8/2009 | Feng | |
| 2010/0017118 A1 | 1/2010 | Dougherty | |
| 2010/0070173 A1 | 3/2010 | Sakamoto | |
| 2010/0115030 A1 | 5/2010 | Hong et al. | |
| 2010/0123737 A1 | 5/2010 | Williamson et al. | |
| 2010/0125410 A1 | 5/2010 | Hicks | |
| 2010/0153004 A1 | 6/2010 | Natsume | |
| 2010/0185386 A1 | 7/2010 | Hess | |
| 2010/0197325 A1 * | 8/2010 | Dredge | H04W 4/02 455/456.3 |
| 2010/0201707 A1 | 8/2010 | Rasmussen et al. | |
| 2010/0211303 A1 | 8/2010 | Stanton | |
| 2010/0253549 A1 | 10/2010 | Kim et al. | |
| 2010/0280853 A1 | 11/2010 | Petralia et al. | |
| 2010/0318285 A1 | 12/2010 | Kim et al. | |
| 2011/0010084 A1 * | 1/2011 | Carlsson | G01C 21/3423 701/533 |
| 2011/0077853 A1 | 3/2011 | Ranford et al. | |
| 2011/0106423 A1 | 5/2011 | Morley | |
| 2011/0112759 A1 | 5/2011 | Bast et al. | |
| 2011/0130950 A1 * | 6/2011 | Wexler | G01C 21/3492 701/532 |
| 2011/0130961 A1 | 6/2011 | Kuenzner et al. | |
| 2011/0177845 A1 | 7/2011 | Fasold | |
| 2011/0178697 A1 | 7/2011 | Mincey et al. | |
| 2011/0181620 A1 | 7/2011 | Hung | |
| 2011/0191014 A1 | 8/2011 | Feng et al. | |
| 2011/0246054 A1 | 10/2011 | Toma | |
| 2011/0301843 A1 | 12/2011 | Gale et al. | |
| 2012/0004840 A1 | 1/2012 | Lee et al. | |
| 2012/0053830 A1 * | 3/2012 | Bach | G01C 21/20 701/438 |
| 2012/0303263 A1 | 11/2012 | Alam et al. | |
| 2012/0303264 A1 | 11/2012 | Su et al. | |
| 2013/0035853 A1 | 2/2013 | Savvopoulos | |
| 2013/0041941 A1 | 2/2013 | Steinfeld | |
| 2013/0046456 A1 | 2/2013 | Schwebel | |
| 2013/0103313 A1 * | 4/2013 | Moore | G01C 21/20 701/533 |
| 2013/0159908 A1 | 6/2013 | Mayerle et al. | |
| 2013/0191020 A1 | 7/2013 | Emani et al. | |
| 2013/0231859 A1 | 9/2013 | Kim et al. | |
| 2013/0234868 A1 | 9/2013 | Koth | |
| 2013/0261956 A1 | 10/2013 | Marks | |
| 2013/0262222 A1 | 10/2013 | Gibson et al. | |
| 2013/0321456 A1 | 12/2013 | Hultquist et al. | |
| 2013/0322665 A1 | 12/2013 | Bennett et al. | |
| 2013/0322702 A1 | 12/2013 | Piemonte et al. | |
| 2013/0325320 A1 | 12/2013 | Dimitriadis | |
| 2013/0325340 A1 | 12/2013 | Forstall et al. | |
| 2013/0325342 A1 | 12/2013 | Pylappan et al. | |
| 2013/0326425 A1 | 12/2013 | Forstall et al. | |
| 2013/0328924 A1 | 12/2013 | Arikan et al. | |
| 2013/0344802 A1 * | 12/2013 | Armour | H04W 84/005 455/39 |
| 2013/0345959 A1 | 12/2013 | van Os et al. | |
| 2013/0345975 A1 | 12/2013 | Vulcano et al. | |
| 2014/0012498 A1 | 1/2014 | Gustafson et al. | |
| 2014/0032114 A1 | 1/2014 | Titus et al. | |
| 2014/0050122 A1 | 2/2014 | Pro et al. | |

(56) References Cited

U.S. PATENT DOCUMENTS

| | | |
|---|---|---|
| 2014/0095066 A1 | 4/2014 | Bouillet et al. |
| 2014/0129135 A1 | 5/2014 | Holden et al. |
| 2014/0129143 A1 | 5/2014 | Dave et al. |
| 2014/0142834 A1 | 5/2014 | Maitra et al. |
| 2014/0278070 A1 | 9/2014 | McGavran et al. |
| 2014/0278071 A1 | 9/2014 | San Filippo et al. |
| 2014/0278616 A1 | 9/2014 | Stone et al. |
| 2014/0340421 A1 | 11/2014 | Otero et al. |
| 2014/0343852 A1* | 11/2014 | Pech ................. G01C 21/3423 701/540 |
| 2014/0358409 A1* | 12/2014 | Khoe ....................... G08G 1/13 701/117 |
| 2014/0358410 A1 | 12/2014 | Khoe et al. |
| 2014/0358411 A1 | 12/2014 | Khoe et al. |
| 2014/0359510 A1 | 12/2014 | Graf et al. |
| 2014/0364150 A1 | 12/2014 | Marti et al. |
| 2014/0365113 A1 | 12/2014 | McGavran et al. |
| 2014/0365122 A1 | 12/2014 | McGavran et al. |
| 2014/0372904 A1* | 12/2014 | Liu .................... G01C 21/3415 715/753 |
| 2015/0046083 A1 | 2/2015 | Maitra et al. |
| 2015/0051823 A1 | 2/2015 | Joglekar |
| 2015/0106012 A1 | 4/2015 | Kandangath et al. |
| 2015/0160024 A1 | 6/2015 | Fowe |
| 2015/0168148 A1* | 6/2015 | Pech .................. G01C 21/3423 701/400 |
| 2015/0170229 A1* | 6/2015 | Flier .................. G06Q 30/0283 705/6 |
| 2015/0177013 A1 | 6/2015 | Siliski et al. |
| 2015/0186414 A1 | 7/2015 | Campbell |
| 2015/0187127 A1 | 7/2015 | Jones et al. |
| 2015/0234529 A1 | 8/2015 | Kim et al. |
| 2015/0253148 A1 | 9/2015 | Moore et al. |
| 2015/0262399 A1 | 9/2015 | Popescu |
| 2015/0308844 A1 | 10/2015 | Shimazaki et al. |
| 2015/0323331 A1* | 11/2015 | Lord .................. G01C 21/3423 701/410 |
| 2015/0332589 A1* | 11/2015 | Eichhorst ............... G08G 1/087 340/906 |
| 2015/0345951 A1* | 12/2015 | Dutta ................. G01C 21/3605 701/400 |
| 2015/0345973 A1 | 12/2015 | Flier et al. |
| 2015/0345976 A1 | 12/2015 | Moore et al. |
| 2015/0369621 A1* | 12/2015 | Abhyanker ............ G01C 21/36 701/461 |
| 2016/0003637 A1 | 1/2016 | Andersen |
| 2016/0033289 A1 | 2/2016 | Tuukkanen et al. |
| 2016/0102992 A1 | 4/2016 | Otero et al. |
| 2016/0116296 A1* | 4/2016 | Nguyen ............. G01C 21/3423 701/533 |
| 2016/0202079 A1* | 7/2016 | Konig ................ G01C 21/3423 701/533 |
| 2016/0216126 A1* | 7/2016 | Park ....................... G08G 1/123 |
| 2016/0216130 A1 | 7/2016 | Abramson et al. |
| 2016/0231129 A1* | 8/2016 | Erez .................. G01C 21/3423 |
| 2016/0282129 A1 | 9/2016 | Wang et al. |
| 2016/0290818 A1* | 10/2016 | Kim ................... G01C 21/3423 |
| 2016/0291820 A1* | 10/2016 | Mak ........................ G01C 21/34 |
| 2016/0298977 A1* | 10/2016 | Newlin ............. G01C 21/3423 |
| 2016/0341564 A1 | 11/2016 | Cheng |
| 2016/0356603 A1 | 12/2016 | Hajj et al. |
| 2016/0356610 A1 | 12/2016 | O'Beirne et al. |
| 2016/0356613 A1 | 12/2016 | Hajj et al. |
| 2016/0356614 A1 | 12/2016 | O'Beirne et al. |
| 2016/0356617 A1 | 12/2016 | Verosub et al. |
| 2016/0356624 A1 | 12/2016 | O'Beirne et al. |
| 2016/0356625 A1 | 12/2016 | O'Beirne et al. |
| 2016/0358469 A1 | 12/2016 | Pirwani et al. |
| 2016/0358470 A1 | 12/2016 | Pirwani |
| 2016/0358471 A1* | 12/2016 | Hajj ................... G01C 21/3423 |
| 2017/0010118 A1 | 1/2017 | Hajj et al. |
| 2017/0031926 A1 | 2/2017 | Katircioglu et al. |
| 2017/0074669 A1* | 3/2017 | Newlin ............. G01C 21/3423 |
| 2017/0343376 A9 | 11/2017 | O'Beirne et al. |
| 2018/0066955 A1 | 3/2018 | O'Beirne et al. |
| 2018/0212684 A1* | 7/2018 | Aoyama .............. H04B 10/541 |

OTHER PUBLICATIONS

Nourish, "Google Maps Introduces New, Smarter Transit Routing," May 17, 2013, Seattle Transit Blog, https://seattletransitblog.com/2013/05/17/google-maps-introduces-guidebook-routing/.*

Gontmakher, "Know when your bus is late with live transit updates in Google Maps," Jun. 8, 2011, Official Google Blog, https://googleblog.blogspot.com/2011/06/know-when-your-bus-is-late-with-live.html.*

Nourish ("Google Maps Introduces New, Smarter Transit Routing," May 17, 2013, Seattle Transit Blog).*

Vuchic ("Role of Organization of Transfers in Transit Networks," 1992, Proceedings of the 6th World Conference on Transport Research).*

Author Unknown, "Transit-BEST Bus & Rail App! How to Navigate Major Cities" MrApp4That, Sep. 24, 2014, available at https://www.youtube.com/watch?v=IEjo_PWWOAQYouTube, USA.

Gontmahker, Sasha, "Know when your bus is late with live transit updates in Google Maps", Official Google Blog, Published Jun. 8, 2011, 11 pages, https://googleblog.blogspot.com/2011/06/know-when-your-bus-is-late-with-live.html.

Non-Published Commonly Owned International Patent Application PCT/US2016/035903, filed Jun. 3, 2016, 77 pages, Apple, Inc.

Bast, Hannah, et al., "Frequency-Based Search for Public Transit", Proceedings of the 22nd ACM Sigspatial International Conference on Advances in Geographic Information Systems, Sigspatial '14, Nov. 4-7, 2014, 19 pages, ACM, Dallas/Fort Worth, USA.

PCT International Search Report and Written Opinion dated Nov. 8, 2016 for commonly owned International Patent Application PCT/US2016/035903, 23 pages, Apple Inc.

Tirachini A. et al.: "Restating modal investment priority with an improved model for public transport analysis", Transportation Research Part E: Logistics and Transportation Review, Pergamon, Amsterdam, NL, vol. 46, No. 6, Nov. 1, 2010 (Nov. 1, 2010), pp. 1148-1168, XP027121542, ISSN: 1365-5545.

Metro "Schedules Bus & Rail" <http://www.ridemetro.org/pages/schedulesbusrail.aspx>.

Metro METRORail Red Line Map & Schedules <http://www.ridemetro.org/pages/RedLine.aspx>.

Maryland Transit Administration, "Light Rail Schedule" <http://mta.maryland.gov/LRTracker/Home/TrainSchedule>.

Bruce Nourish: "Google Maps Introduces New, Smart Transit Routing", Seattle Transit Blog, May 17, 2013 (May 17, 2013), XP002761347, Retrieved from the Internet: URL: https://seattletransitblog.com/2013/05/17/google-maps-introduces-guidebook-routing/.

* cited by examiner

FREQUENCY BASED TRANSIT TRIP CHARACTERIZATIONS

CLAIM OF BENEFIT TO PRIOR APPLICATIONS

This application claims the benefit of U.S. Provisional Patent Application 62/172,206, filed Jun. 7, 2015; U.S. Provisional Patent Application 62/172,209, filed Jun. 7, 2015; U.S. Provisional Patent Application 62/172,214, filed Jun. 7, 2015; and U.S. Provisional Patent Application 62/172,216, filed Jun. 7, 2015. U.S. Provisional Patent Applications 62/172,206, 62/172,209, 62/172,214, and 62/172,216 are incorporated herein by reference.

BRIEF SUMMARY

Some embodiments of the invention provide a map application that provides a comprehensive and efficient transit navigation modality for planning a transit trip by browsing and selecting a transit route and navigating the selected transit route. The map application of some embodiments operates in a map-browsing mode to allow a user to browse a map of a locality and to perform searches for map locations based on addresses, names (e.g., people, businesses, etc.) or other search parameters. The map application of some such embodiments also has a navigation mode that includes a driving navigation mode to provide driving navigation directions, a walking navigation mode to provide walking navigation directions, and a transit navigation mode to provide transit navigation directions.

The map application of some embodiments, upon receiving a request to display a route in transit mode, identifies one or more transit routes between two locations and displays the best possible transit route among the identified routes to the user. Specifically, to identify the transit routes, the application of some embodiments examines different transit legs that one or more transit vehicles of one or more transit systems travel from locations near a specified starting location (e.g., the current location of the device) to locations near a specified destination. In some embodiments, each transit leg of a transit route includes a section of the transit route that is travelled by a transit vehicle of a transit line. A transit leg may also include a walking distance that is more than a threshold distance.

In examining the transit legs, the application of some embodiments takes into account a set of transit preferences that are customized (i.e., set or adjusted) by the user. For instance, in some embodiments, a user may adjust the date and time of the departure (from, e.g., the current location of the user) to a particular date and time instead of the current time. Conversely, the user may prefer a particular type of transit vehicle (i.e., a transit vehicle of a particular transit system) over the other types. For example, the user might rather ride a subway train over a bus for a particular transit leg of a transit route, or use only ground transportation for an entire transit route (e.g., a transit route without any ferry trips).

Based on the examination of the transit legs, the map application identifies one or more transit routes that use one or more transit vehicles of one or more transit systems in some embodiments. The identified transit routes may also include one or more pedestrian routes that are between the different transit legs, between the starting location and the first transit leg, and between the last transit leg and the destination location. After identifying the transit routes, the map application selects one of the identified transit routes based on a set of criteria (e.g., fastest route, shortest route, route with least amount of walking, route requiring least amount of transit vehicle changes, route requiring least amount of transit system changes, etc.). In some embodiments, the set of selection criteria relies on two or more selection parameters. Also, in some embodiments, the set of selection criteria is different in different transit markets and/or in different time periods in the same transit market.

The map application of some embodiments displays the best identified route in its entirety over a portion of a map presentation of a geographical area. The application of some such embodiments displays the identified route in multiple sections (transit legs) each of which is traveled by a transit vehicle of a particular transit line. The map application uses different graphical representations for different portions of a displayed transit route that are travelled by different types of transit vehicles or require walking.

In some embodiments, the different types of transit vehicles that are presented by different graphical representations include buses, subway trains, rail trains (e.g., light rail trains and heavy rail trains), and ferries. Each of these four categories may include multiple different subcategories in some embodiments and additional transit categories (e.g., tramways, trolleys, etc.) may be present in some embodiments. When the selected transit route includes multiple transit vehicles of the same type (same transit system), each transit vehicle of the same transit system is distinguished from the other transit vehicles by a different line of the transit vehicle.

Some embodiments categorize different transit lines of a transit route into two categories of high frequency transit lines and low frequency transit lines. In some such embodiments a first transit line (e.g., a first bus line) can be categorized as a low frequency transit line at a particular transit station, while a second different transit line (e.g., a second bus line) can be categorized as a high frequency transit line at the particular transit station. Conversely, in some embodiments, a transit line can be categorized as a high frequency transit line at a particular transit station during a first time period (e.g., on even days of the week, in the mornings, between two particular hours, etc.), while the same transit line can be categorized as a low frequency transit line at the same particular station but during a second different time period (e.g., on odd days of the week, in the evenings, between two particular hours, etc.).

The map application of some embodiments treats the high frequency transit lines differently than the low frequency transit lines. For example, the application presents the departure times of high frequency transit vehicles in a first manner while it presents the departure times of low frequency transit vehicles in a second different manner in different display areas of the UI of the application. Additionally, the application of some embodiments classifies high frequency transit lines into different classes and presents the frequency of departure for each class differently. Characterizing the transit lines as high frequency transit lines and low frequency transit lines and computing the frequency of departures of a particular transit line are done by a mapping service that runs on one or more dedicated servers in some embodiments.

In order to determine the frequency of departures of a transit line from a transit station during a particular time period, the mapping service of some embodiments first determines whether the transit vehicles of the line depart from the transit station on average at least once during a certain time period (e.g., every 30 minutes for at least 2 hours). This certain time period can be different in different areas or for different transit lines of the same or different transit systems. When the mapping service of some such embodiments determines that the vehicles of the transit line depart at least once during the certain time period, the service categorizes the transit vehicles of the line as high frequency transit vehicles. The mapping service then computes the frequency of departures for high frequency transit lines.

In order to compute the frequency, the mapping service of some embodiments first identifies the time intervals between each pair of departures of the transit vehicles of the line that head the same direction from the same transit station during a particular time period. The service then applies a series of mathematical functions and formulas to the identified numbers (i.e., the sequence of the gaps between the departure times) in order to calculate the frequency of departures for the line. In some embodiments the calculated departure frequency can be a value (number) that represents the exact frequency of departures (e.g., every 5 minutes), a number that represents an approximation of frequency of departures (e.g., about every 5 minutes), or a range of numbers (e.g., every 5-8 minutes). Some embodiments first determine whether an exact frequency can be used, then determine (if no exact frequency is found) whether one of a set of frequency ranges can be used, and only attempt to find an approximate frequency value if the first two options are unsuccessful.

For a high frequency transit line, the map application of some embodiments displays the departure time of the line in a frequency format. That is, the application displays the frequency of departures of the transit vehicles of the line (e.g., every 5 minutes, 5-10 minutes, etc.) from the transit station. For a low frequency transit line, however, the map application of some such embodiments displays the departure time in an absolute time format. That is the map application displays the time at which the transit vehicles of the line leave the station (e.g., at 2:30 pm, at 3:30 pm). In some embodiments, the application displays only one frequency of departures for a high frequency line (e.g., under the trip heading in a placecard), while it displays multiple departure times for the next transit vehicles of a low frequency line (e.g. the next three departure times of a train line under the trip heading of the line). Some embodiments also provide an overall transit frequency for a selected transit route. That is, some such embodiments not only provide a transit frequency for each transit leg of the route that is services by a high frequency transit line, but also provide a transit frequency for the sum of the transit legs of the route.

Additionally, the map application of some embodiments can intelligently guide the user to plan for a transit trip based on the user's location. The map application of some such embodiments first identifies the location of the device on which the application runs. The application then evaluates the distance between the device and the first transit station at which the user boards the first transit vehicle. When the application realizes that the user is far away from the transit station (e.g., farther than a threshold distance), the application displays the time by which the user should start the transit trip (i.e., the user should leave the current location towards the first transit station). On the other hand, when the user is at or near the transit station (e.g., closer than the threshold distance), the application displays the time at which the first transit vehicle of the line leaves the transit station.

The preceding Summary is intended to serve as a brief introduction to some embodiments of the invention. It is not meant to be an introduction or overview of all-inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
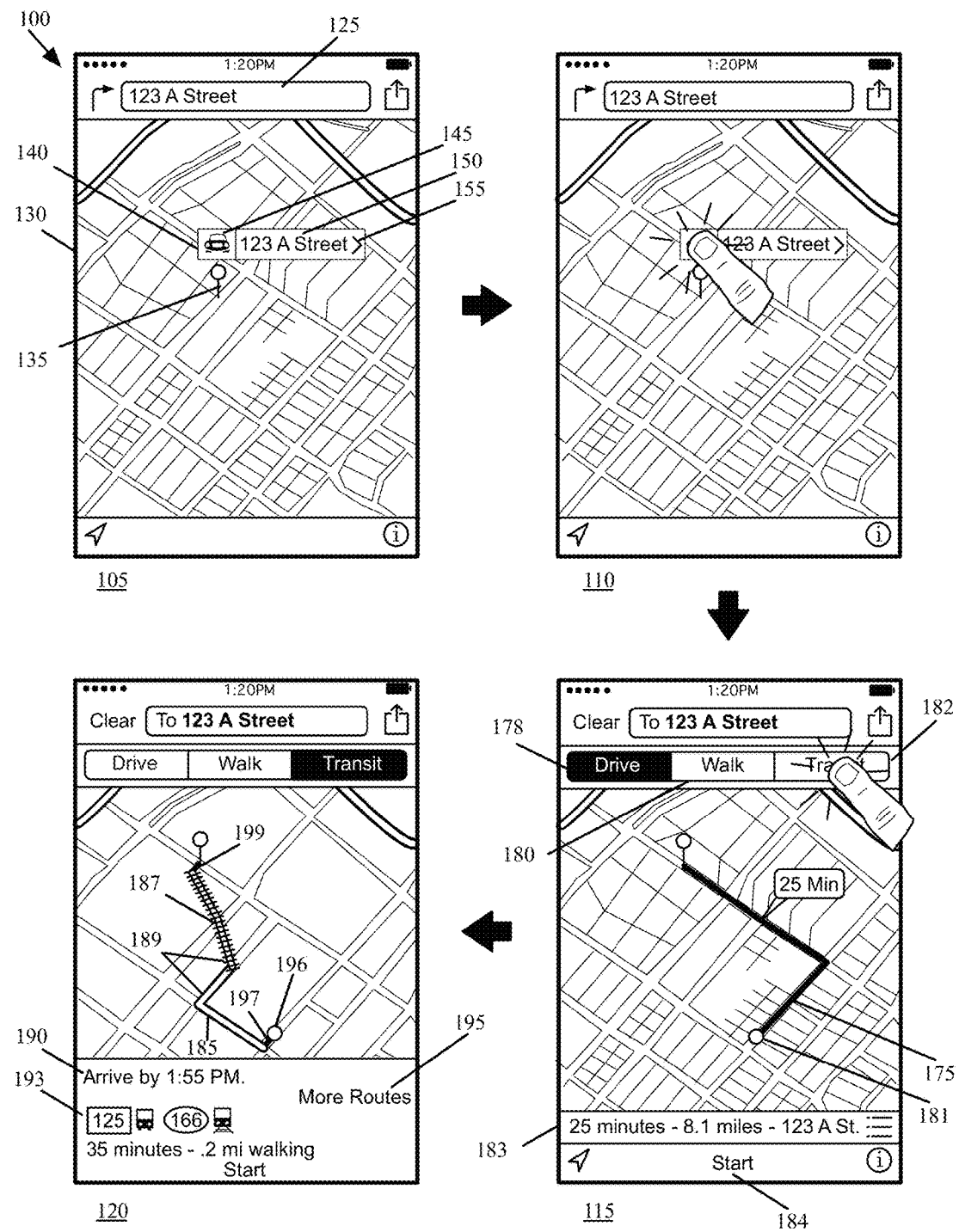
FIG. 1 illustrates how the transit navigation mode of a map application can be selected.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a map application that provides a comprehensive and efficient transit navigation modality for planning a transit trip by browsing and selecting a transit route and navigating the selected transit route. The map application of some embodiments operates in a map-browsing mode to allow a user to browse a map of a locality and to perform searches for map locations based on addresses, names (e.g., people, businesses, etc.) or other search parameters. The map application of some such embodiments also has a navigation mode that includes a driving navigation mode to provide driving navigation directions, a walking navigation mode to provide walking navigation directions, and a transit navigation mode to provide transit navigation directions.

The map application of some embodiments, upon receiving a request to display a route in transit mode, identifies one or more transit routes between two locations and displays the best possible transit route among the identified routes to the user. Specifically, to identify the transit routes, the application of some embodiments examines different transit legs that one or more transit vehicles of one or more transit systems travel from locations near a specified starting location (e.g., the current location of the device) to locations near a specified destination. In some embodiments, each transit leg of a transit route includes a section of the transit route that is travelled by a transit vehicle of a transit line. A transit leg may also include a walking distance that is more than a threshold distance.

In examining the transit legs, the application of some embodiments takes into account a set of transit preferences that are customized (i.e., set or adjusted) by the user. For instance, in some embodiments, a user may adjust the date and time of the departure (from, e.g., the current location of the user) to a particular date and time instead of the current time. Conversely, the user may prefer a particular type of transit vehicle (i.e., a transit vehicle of a particular transit system) over the other types. For example, the user might rather ride a subway train over a bus for a particular transit leg of a transit route, or use only ground transportation for an entire transit route (e.g., a transit route without any ferry trips).

Based on the examination of the transit legs, the map application identifies one or more transit routes that use one or more transit vehicles of one or more transit systems in some embodiments. The identified routes may also include one or more pedestrian routes that are between the different transit trips, between the starting location and the first transit trip, and between the last transit trip and the destination location. After identifying the transit routes, the map application selects one of the identified transit routes based on a set of criteria (e.g., fastest route, shortest route, route with least amount of walking, route requiring least amount of transit vehicle changes, route requiring least amount of transit system changes, etc.), and displays this selected route over the map presentation. In some embodiments, the selection criteria set relies on two or more selection parameters. Also, in some embodiments, the selection criteria set is different in different transit markets and/or in different time periods in the same transit market.

The map application of some embodiments displays the best identified route in its entirety over a portion of a map presentation of a geographical area. The application of some such embodiments displays the identified route in multiple sections (transit legs) each of which is traveled by a particular transit vehicle. The map application uses different graphical representations for different portions of a displayed transit route that are travelled by different types of transit vehicles or require walking. In some embodiments, the different types of transit vehicles that are presented by different graphical representations include buses, subway trains, rail trains (e.g., light rail trains and heavy rail trains), and ferries. Each of these four categories may include multiple different subcategories in some embodiments. When the selected transit route includes multiple transit vehicles of the same type (same transit system), each transit vehicle of the same transit system is distinguished from the other transit vehicles by a different line of the transit vehicle (e.g., a different subway line, a different bus line, etc.).

Several detailed embodiments of the invention are described below. Section I describes transit navigation mode of a map application of some embodiments. Section II then describes characterization of transit lines based on departure frequency. Section III follows with a description of a method for computing departure frequencies. Section IV describes example electronic systems with which some embodiments of the invention are implemented. Finally, Section V describes a map service operating environment.

I. Transit Navigation Mode

FIG. 1 illustrates a map application that provides transit navigation presentations of some embodiments of the invention. In some embodiments, the map application executes on a mobile device (e.g., a smartphone, a tablet, a laptop, etc.) with a touch-sensitive display screen. Although, all the features and concepts of the map application discussed below are equally applicable to other devices with non-touch-sensitive display screens. The map application can operate in a map-browsing mode to allow a user to browse a map of a locality and to perform searches for map locations based on addresses, names (e.g., people, businesses, etc.) or other search parameters. The application also has a navigation mode that includes a driving navigation mode to provide driving navigation directions, a walking navigation mode to provide walking navigation directions, and a transit navigation mode to provide transit navigation directions.

FIG. 1 illustrates, in four operational stages 105-120 of the user interface (UI) 100 of the map application, how the transit navigation mode of the map application can be selected by requesting for a route from the current location of the user to a searched destination. The application then displays a route that is travelled by a combination of two different transit vehicles (of two different types) between the current location of the user and the searched destination. Some embodiments provide the user with a search box to search for a particular location. The user may then enter an address of a particular place or alternatively a name of the place in the search box. When the address (or name) of the place is specified, the map application of some embodiments provides an indicator (e.g., a pin) over a presentation of the map to display the exact location of the place on the map presentation. In addition, some such embodiments display a banner (e.g., over the pin) with selectable controls for providing more information about the place.

The first stage 105 of FIG. 1 illustrates a search box 125, a map presentation area 130 that displays a map of a geographical area, a pin 135, and a banner 140. The banner 140 includes a selectable route control 145 (which is depicted as a presentation of a car), a name 150 of the searched place, and a selectable control 155 (which is depicted as a right arrow). In the search box 125, a user can enter a search parameter to search for a particular location for display in the map presentation area 130. In some embodiments, the search parameter can be an address or a name of an entity (e.g., business, organization, person, etc.), or some other parameter. When the map application can identify one or more locations for the search parameter that it receives, the map application in some embodiments (1) displays, in the presentation area 130, a map that displays some or all of the identified locations, and (2) displays a pin 135 or other location indicator for each displayed location to identify the position of the identified location. Also, in some embodiments, the map application displays a banner 140 over one of the pins 135 for providing access to more information about the location identified by the pin. The banner also provides some information about the identified location.

The first stage 105 of the figure shows that the user has entered an address in the search box 125 (123 A Street). As a result, the application displays, in the map presentation area 130, a map of a particular geographical area in which the entered address is located. This stage also shows that the application further displays (1) the pin 135 over the map presentation to identify the location of the entered address on the map and (2) the banner 140 over the pin. As shown, this banner includes the address "123 A Street," the route control 145, and the selectable control 155, which when selected causes the map application to present a display area (e.g., a placecard) that provides more information about the identified location.

The second stage 110 illustrates that the user selects the selectable route control 145 (e.g., by performing a gestural input on the touch-sensitive display screen of the device, such as tapping the user's finger on the control 145). Selection of the route control 145 causes the application to display a route overview (e.g., a driving route) from the current location of the user to the searched location (i.e., to the pin 135) over the map presented in the map presentation area 130. In some embodiments, the route control 145 is also for initiating a navigation experience. For instance, the map application of some embodiments provides one or more routes to the location of the pin from the current location of the device upon receiving a selection of the route control. When a route is selected, the map application can start operating in a navigation mode or in a route inspection mode depending on the user's next selection.

The third stage 115 shows that the displayed route 175 is laid over the region map. The third stage 115 also shows three navigation mode controls, which are the driving mode control 178, the walking mode control 180, and the transit mode control 182. Through these controls, the user can direct the map application to provide one or more driving routes, walking routes, and transit routes from the specified starting location (i.e., the device's current location in this example) to the specified destination (i.e., to 123 A Street in this example). The third stage 115 shows the driving mode control 178 highlighted to indicate that the route 175 that the application initially provides is a driving route. In some embodiments, the map application dynamically determines whether to provide an initial driving, walking or transit route based on the distance to the destination, the locality in which the device currently operates, and the detected current mode of transportation for the device (if any).

The map application of some embodiments makes a dynamic determination for the default mode of navigation based on a set of motion data that it receives through the different sensors of the device and a set of rules that specifies the default mode of navigation under different detected conditions. For instance, the application detects the current user activity (e.g., driving, walking, biking, etc.) from motion data that some detecting sensors of the device collect and based on the determined activity, automatically sets the default navigation mode to the pedestrian mode (i.e., walking mode) or driving mode. For instance if the application determines, based on the motion data it receives from the motion sensors, that the user of the device is in a vehicle, the application sets the default navigation mode to driving mode (as illustrated in this example).

In some embodiments, the map application uses a combination of the motion data that it receives through the motion sensors, and the distance to the desired destination in order to determine which navigation mode should be the default mode. For instance, in some embodiments, the application does not set the default mode to the pedestrian mode when the destination location is not within a threshold distance (e.g., two miles) from the current position of the user even if the motion data indicate that the user is walking Conversely, the application of some embodiments does not set the default mode to the driving mode when the destination location is within a threshold distance (e.g., 0.5 miles) from the current position of the user and the motion data indicate that the user is not driving.

The third stage also shows that for the displayed route, the map application provides information about the route in a display area 183. For instance, in the driving mode, the display area 183 displays the driving distance and duration to the destination from the current location of the device. The third stage also shows that the route-overview presentation includes a start control 184 for starting a turn-by-turn navigation experience to the destination based on the currently selected navigation mode (e.g., driving mode, walking mode, or transit mode). For example, when the map application is displaying a transit route overview presentation in the transit mode, selection of the start control 184 directs the map application to start a transit navigation presentation that provides transit navigation directions from the device's current location to the destination. Navigating a transit route is described is great detail in the concurrently filed U.S. patent application Ser. No. 14/869,570 entitled "Transit Navigation", which is incorporated herein by reference.

The third stage shows that the user selects the transit control 182 (e.g., by tapping on the tab 182) to change the navigation mode of the application from a driving navigation mode to transit navigation mode. Upon receiving this request, the map application of some embodiments identifies one or more transit routes to the specified destination, selects one of the identified transit routes as the best possible transit route based on a set of criteria, and displays the selected transit route 189, as shown in the fourth stage 120.

The map application of some embodiments, upon receiving a request to display a route in transit mode, identifies the best possible transit route among several different routes between two locations and displays the route to the user. Specifically, to identify the transit routes, the application of some embodiments examines trips that one or more transit vehicles of one or more transit systems make from locations nearby a specified starting location (e.g., the current location of the device) to locations near the specified destination. Based on this examination, the application identifies one or more transit routes that use one or more transit vehicles of one or more transit systems in some embodiments.

After identifying the transit routes, the map application then selects one of the identified transit routes based on a set of criteria (e.g., fastest route, shortest route, route with least amount of walking, route requiring least amount of transit vehicle changes, route requiring least amount of transit system changes, etc.), and displays this identified route over the map presentation in the presentation area 130. In some embodiments, the selection criteria set relies on two or more selection parameters. Also, in some embodiments, the selection criteria set is different in different transit markets and/or in different time periods in the same transit market.

Although in the descriptions above and below, the map application is identified as the performer of actions such as identification and ranking of the transit routes, in some embodiments some or all of these actions are performed by a mapping service, which then provides the results to the map application. For instance, in some embodiments the identification of different transit routes and selection of the best possible route among the identified transit routes is done by a mapping service that runs on one or more dedicated servers.

The mapping service of some embodiments is the same mapping service that provides other map browsing and navigation data (e.g., routing data, traffic data, map tiles, etc.) to the map application. In some other embodiments, the mapping service is a designated service for providing transit data to the map application. The mapping service of some embodiments receives a request for transit routes, which includes the starting and destination locations. The service then identifies a set of available transit routes based on the user preferences, ranks the identified transit routes based on a set of criteria, and returns the ranked identified transit routes to the map application. The map application then displays the highest ranked transit route as the selected transit route in the transit navigation mode to the user.

In some embodiments, the application ranks the identified routes based on the set of criteria and some other factors. For instance, the application initially ranks the identified routes with the shortest transit route having the highest ranking. The application then requests for and receives real time incident (e.g., traffic) data for the identified routes (e.g., from a set of dedicated servers, from a designated incident curator that gathers incident data from different sources, etc.). Based on the received data, the application of some embodiments rearranges the routes and ranks them again for a second time. The application then displays the highest ranked (secondary ranked) transit route in the route presentation area. In some embodiments, as discussed above, a mapping service identifies and ranks the transit routes. In some such embodiments, the mapping service requests the real time incident data from dedicated servers in order to rank the transit routes. In some embodiments, the mapping service gathers and maintains the incident data directly (e.g., through an incident curator module of the mapping service).

The fourth stage 120 illustrates that the route 175 in the previous stage 115, is now replaced by a transit route 189 as a result of selecting the transit navigation mode as the operational mode of the application. The preferred criterion in this example is the least amount of walking and therefore the transit route shown in the figure is selected as the best transit route because it includes the minimal walking distance between the departure point, the transit stations, and the destination point.

In addition to a predefined set of criteria, the application of some embodiments selects the best possible route based on a set of transit preferences set by a user. The user in some embodiments customizes the application by setting or adjusting a set of transit preferences provided by the map application. For instance, in some embodiments, a user may adjust the date and time of the departure to a particular date and time instead of the current time. In some embodiments, the user may prefer a particular type of transit vehicle (i.e., a transit vehicle of a particular transit system) over the other types. For example, the user might rather ride a subway train over a bus in a particular transit trip, or use only ground transportation for an entire transit route (e.g., a transit route that does not include a ferry trip). Customizing the route selection is further described in the concurrently filed U.S. patent application Ser. No. 14/869,403 entitled "Map application with Transit Navigation Mode", which is incorporated herein by reference.

Some embodiments display the best route in its entirety over a portion of a map of a geographical area. Some such embodiments display the route in multiple sections each of which is traveled by a particular transit vehicle. In some embodiments, the map application uses different representations for different portions of a displayed transit route that are travelled by different transit vehicles or require walking. The displayed transit route in the fourth stage 120 includes two different portions 185 and 187. The first portion (leg) of the transit route (i.e., the route portion 185) is travelled by a bus, while the second portion (i.e., the route portion 187) is travelled by a subway train. The two portions are displayed by two different graphical representations (e.g., a bus route representation for the bus portion and a rail representation for the train portion) to differentiate the bus and subway portions from each other. In the discussions below, a transit leg refers to a portion of a transit route that starts or ends with a transit maneuver that requires a transit vehicle change or a walking portion with a minimum threshold distance in a transit route.

In the illustrated example, two small walking portions 197 and 199 are also displayed. Specifically, the walking portion 197 represents the walking distance from the current location of the device (user) 196 to the first transit station (i.e., the first bus stop of the transit route). The second walking portion 199 represents the walking distance from the last transit station (i.e., the last subway station of the transit route) to the destination location. Although these walking portions are part of the path that the user of the device travels to reach the destination, as will be discussed in more detail below, they are not considered as separate legs of the transit route in some embodiments. Some such embodiments identify a walking portion of a transit route as a transit leg of the route only if the walking distance is equal to or more than a threshold length (e.g., more than half a mile, more than one mile, etc.). Any walking portions less than the threshold will not be identified as a walking leg of the transit route in these embodiments.

In some embodiments, the different types of transit vehicles that are presented by different graphical representations include buses, subway trains, rail trains (e.g., light rail trains and heavy rail trains), and ferries. Each of these four categories may include multiple different subcategories in some embodiments. For example, the bus category may include single-deckers, double-deckers, rigid buses, articulated buses, etc. that are provided by the same or different bus service providers. As another example, a light rail train may include many different types of city trains such as streetcars, trams, trolleys, etc. that are provided by the same or different light rail service providers. Additionally, the best route may include multiple transit vehicles of the same type (same transit system) in some embodiments. In such a case, each transit vehicle of the same transit system is distinguished from the other transit vehicles by a different line of the transit vehicle. For example a transit route may include three different bus legs that are serviced by three buses of three different bus lines.

The display area 183 of the third stage 115 is divided in the fourth stage 120 into two display areas 190 and 193. The incident display area 190 currently shows the arrival time at the destination. However, this display area is also for displaying various other transit information that can help the user to plan the transit trip more easily. Displaying different transit information in the display area 190 is further described in the concurrently filed U.S. patent application Ser. No. 14/869,694 entitled "Transit Incidents", which is incorporated herein by reference. A few examples of this additional transit information include (1) any incident that has occurred along the displayed transit route, (2) an incident that has occurred along another route which has caused the displayed route ranked better than the other route, (3) departure time or frequency of departures for the first leg of the transit route, and (4) departure frequency of the entire route.

The display area 193 is for displaying a route summary presentation for the displayed transit route. More specifically, this display area shows a different representation for each transit vehicle for each leg of the transit route along with the line of the transit vehicle. As illustrated in this example, the display area 193 currently shows a representation for a bus of the line 125 that travels the first leg of the transit route and a representation for a subway train of the line 166 that travels the second leg of the transit route.

Each representation for a transit vehicle, in the illustrated example, includes a logo that represents the type of the transit vehicle (e.g., a bus logo, a subway train logo, etc.), and a geometric shape that (1) includes the line of the transit vehicle and (2) is different for different types of transit vehicles (e.g., a rectangle for bus lines, an ellipse for subway lines, etc.). However, one of ordinary skill in the art would realize that the different types of transit vehicles could be represented in different embodiments differently. For example some embodiments provide different colors for the different representations to distinguish them from each other while other embodiments provide different graphical shapes that represent different types of transit vehicles.

The fourth stage 120 also shows a selectable More Routes control 195 for showing more routes. As discussed above, the displayed transit route is the best transit route that the application selects among a set of different routes based on a set of different criteria as well as a set of user preferences. Selecting the control 195 causes the application to show the other routes in the set of different routes in a separate display area. Displaying all the identified transit routes and interacting with the route representations are further described in the concurrently filed U.S. patent application Ser. No. 14/869,403 entitled "Map application with Transit Navigation Mode",.

II. Characterizing Transit Lines Based on Departure Frequencies

In some embodiments a transit line is characterized as a high frequency or a low frequency transit line based on the number of departures of the transit vehicles of the line from a particular transit station during a particular period of time. Similarly, in some embodiments a transit vehicle of a particular line is characterized (1) as a high frequency transit vehicle when the transit vehicle belongs to a high frequency line, and (2) as a low frequency transit vehicle when the line of the vehicle is a low frequency transit line.

Accordingly, in some embodiments, a first transit line (e.g., a first bus line) can be characterized as a low frequency transit line at a particular transit station, while a second, different transit line (e.g. a second bus line) can be characterized as a high frequency transit line at the particular transit station. Conversely, in some embodiments, a transit line can be characterized as a high frequency transit line at a particular transit station during a first time period (e.g., on even days of the week, in the mornings, between two particular hours, etc.), while the same transit line can be characterized as a low frequency transit line at the same particular station but during a second different time period (e.g., on odd days of the week, in the evenings, between two particular hours, etc.).

The map application of some embodiments treats the high frequency transit lines differently than the low frequency transit lines. As one example, the application presents the departure times of high frequency transit vehicles in a first manner while it presents the departure times of low frequency transit vehicles in a second different manner in different display areas of the UI of the application. Additionally, the application of some embodiments classifies high frequency transit lines into different classes and presents the frequency of departure for each class differently.

In some embodiments, categorizing the transit lines into high and low frequency lines and computing the frequency of departures of a particular transit line are done by a mapping service that runs on one or more dedicated servers. In some embodiments the mapping service is the same mapping service from which the map application receives the different mapping data (e.g., road data, traffic data, etc.) and routing data. In some embodiment the map application computes the departure frequencies, while in other embodiments part of the departure frequencies is computed by the device on which the map application executes and the other part of the departure frequencies is received from one or more mapping services.

In order to determine the frequency of departures of a transit line from a transit station during a particular time period, the mapping service of some embodiments first determines whether the transit vehicles of the line depart from the transit station on average at least once during a certain time period (e.g., 30 minutes). This certain time period can be different in different areas or for different transit lines of the same or different transit systems. When the mapping service of some such embodiments determines that the vehicles of the transit line depart at least once during the certain time period, the service categorizes the transit vehicles of the line as high frequency transit vehicles. The mapping service then calculates the frequency of departures for high frequency transit lines.

For example, in order to determine whether a bus line at a bus stop is a high frequency line or a low frequency line, the mapping service determines whether a bus of the line departs from the bus stop every N (e.g., 25) minutes for the next M hours (e.g., 3 hours). If there is at least one bus that departs from the stop in every N minutes for the next M hours, the mapping service categorizes the bus line as a high frequency line at the station for the next M hours. In some embodiments the mapping service makes such a determination based on the transit data that it receives from one or more transit service providers. In some embodiments, the mapping service periodically requests for or automatically receives the transit data from the transit service providers while in other embodiments the mapping service requests the transit data when it receives a request (e.g., from a map application) for departure frequency of a line.

In order to compute the frequency, the mapping service of some embodiments first identifies the time intervals between each pair of departures of the transit vehicles of the line that head the same direction from the same transit station during a particular time period. The service then applies a series of mathematical functions and formulas to the identified numbers (i.e., the sequence of the gaps between the departure times) in order to calculate the frequency of departures for the line. In some embodiments the calculated departure frequency can be a number that represents the exact frequency of departures (e.g., every 5 minutes), a number that represents an approximation of frequency of departures (e.g., about every 5 minutes), or a range of numbers (e.g., every 5-8 minutes). Some embodiments first determine whether an exact frequency can be used, then determine (if no exact frequency is found) whether one of a set of frequency ranges can be used, and only attempt to find an approximate frequency value if the first two options are unsuccessful.

Depending on the frequency category of a transit line at a transit station, the map application of some embodiments displays the departure schedule of the transit line in a different format on different display areas of the UI of the application (e.g., on placecards, navigation banners, etc.). For example, for a high frequency transit line, the map application displays the departure time of the line in a frequency format. That is, the application displays the frequency of departures of the transit vehicles of the line (e.g., every 5 minutes, 5-10 minutes, etc.) from the transit station. For a low frequency transit line, however, the map application of some such embodiments displays the departure time in an absolute time format. That is the map application displays the time at which the transit vehicles of the line leave the station (e.g., at 2:30 pm, at 3:30 pm). In some embodiments, the application displays only one frequency of departures for a high frequency line (e.g., under the trip heading in a placecard), while it displays multiple departure times for the next transit vehicles of a low frequency line (e.g. the next three departure times of a train line under the trip heading of the line).

Figure 2:
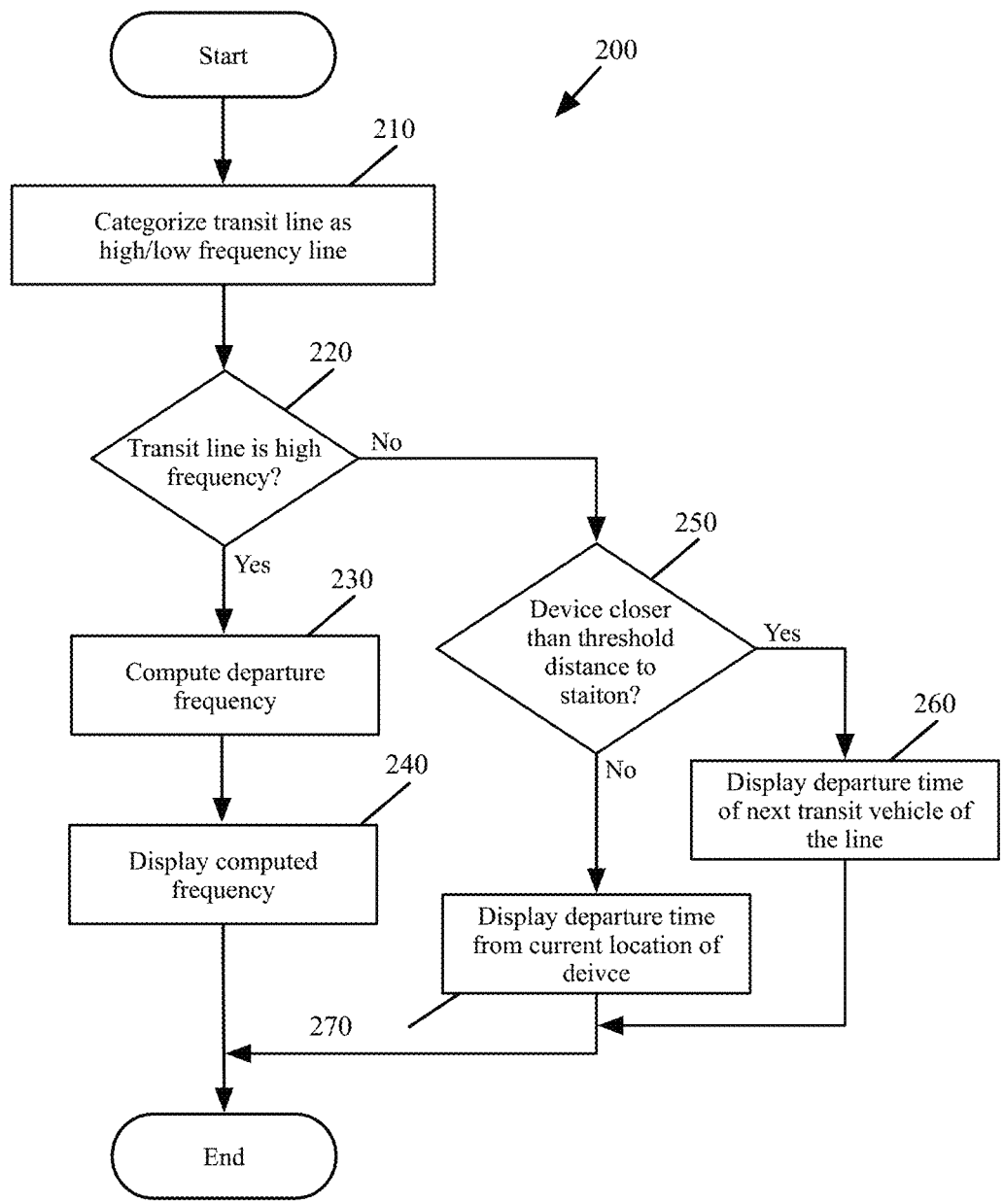
FIG. 2 conceptually illustrates a process that some embodiments perform to provide departure schedule of a transit line.

FIG. 2 conceptually illustrates a process 200 that some embodiments perform to provide departure schedule of a transit line. In some embodiments, this process is performed by the mapping service as described above while in other embodiments the process is formed by the map application. The process 200 is initiated by categorizing (at 210) the transit line as either a high frequency transit line or a low frequency transit line. As described above, some embodiments categorize a transit line as a high frequency transit line when the transit vehicles of the line depart from a particular transit station on average at least once during a certain time period (e.g., 30 minutes) in a certain duration of time (e.g., 2 hours). Otherwise some such embodiments categorize the line as a low frequency transit line.

The process then determines (at 220) whether the transit line is a high frequency transit line or low frequency. When the process determines that the transit line is high frequency, the process computes (at 230) the departure frequency of the transit line. As described above and below, the process of some embodiments computes the departure frequency of the line by determining whether a collection of successive gaps in the departure times of the transit line from a particular transit station can be expressed by (1) a single exact number, (2) a single approximate number, or (3) a pair of numbers that describe the range of gaps between successive departure times.

After computing the departure frequency of the high frequency transit line, the process 200 provides (at 240) the computed frequency (e.g., "every 5 minutes," "about every 10 minutes," or "4-8 minutes") as the departure schedule of the transit line. The process then ends. The process of some embodiments provides the departure frequency to be displayed in different display areas of the map application. For example the departure frequency can be displayed, as the departure schedule of a transit line, in a transit station's placecard from which the transit line departs, in the navigation banner that shows navigation instruction related to the transit line, etc. On the other hand, when the process determines (at 220) that the transit line is a low frequency transit line, the process determines (at 250) whether the device is closer than a threshold distance to the transit station at which the departure schedule of the transit line was sought to be displayed.

When the process determines that the device is closer than the threshold distance, the process provides (at 260) the departure time of the transit line's next transit vehicle. That is, the process provides (e.g., in the transit station's placecard, in the navigation banner, etc.) an absolute departure time at which the next transit vehicle of the line leaves the transit station (e.g., "Departs at 2:30 pm," etc.). The process then ends.

Alternatively, when the process determines that the device is outside the threshold distance from the transit station, the process provides (at 270) the departure time from current location of the device. That is, the process provides (e.g., to be displayed in a route planning display area, in a navigation banner, etc.) the time by which the user should leave the current location to be able to board the next transit vehicle of the line at the transit station. As discussed above, some embodiments, display only one frequency of departures for a high frequency line (e.g., under the trip heading in a placecard), while these embodiments display several departure times for the next transit vehicles of a low frequency transit line (e.g. the next three departure times of a train line under the trip heading of the line at the train station). The process then ends.

Some embodiments perform variations of the process 200. The specific operations of the process 200 may not be performed in the exact order shown and described. Additionally, the specific operations may not be performed in one continuous series of operations, and different specific operations may be performed in different embodiments. For example, the process of some embodiments displays one or more countdowns to the next departure times of a transit line next to the computed frequency when the process displays the computed frequency.

Figure 3:
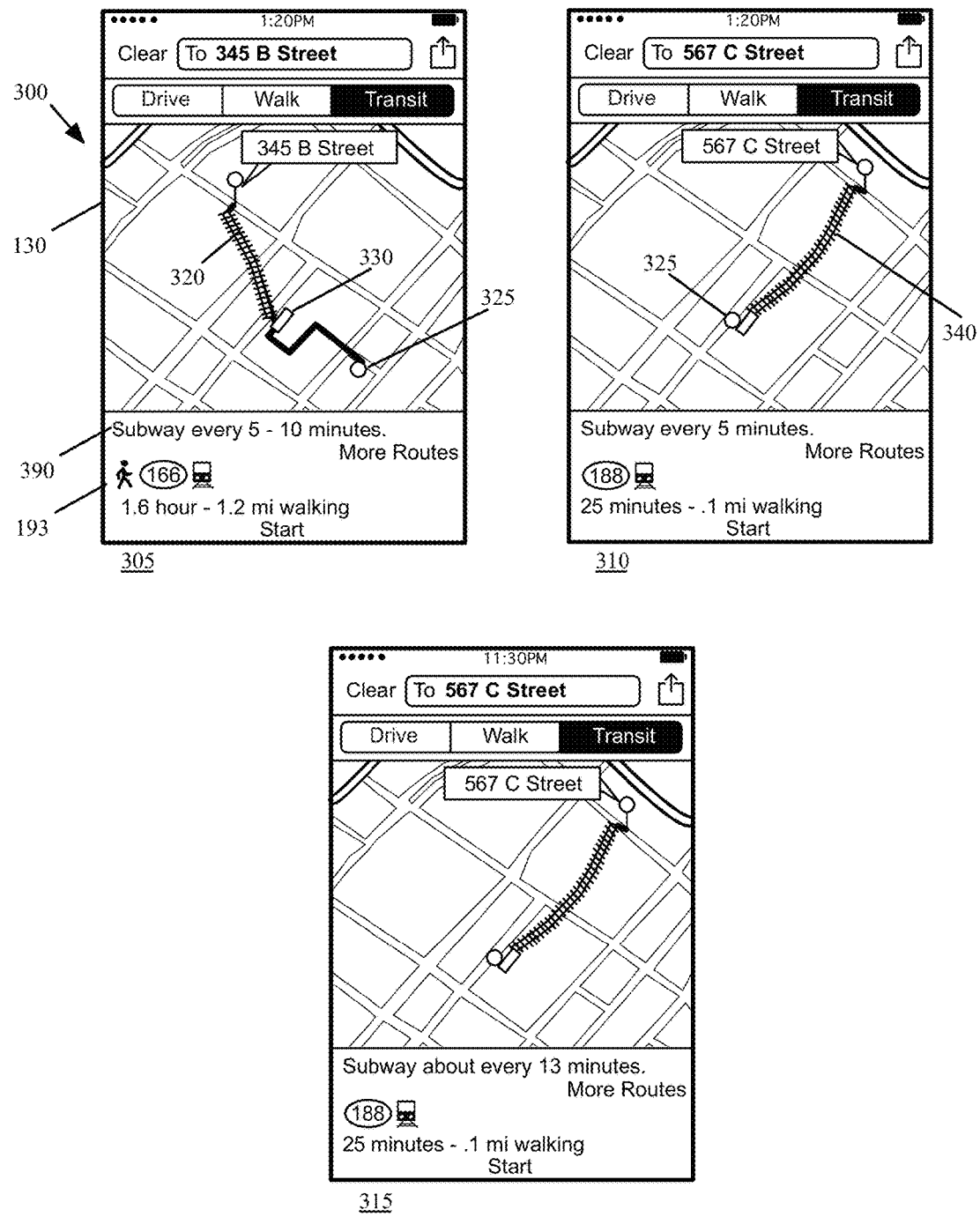
FIG. 3 illustrates the UI of the map application of some embodiments that displays the departure schedule of a subway train from a subway station in terms of three different examples.
Figure 4:
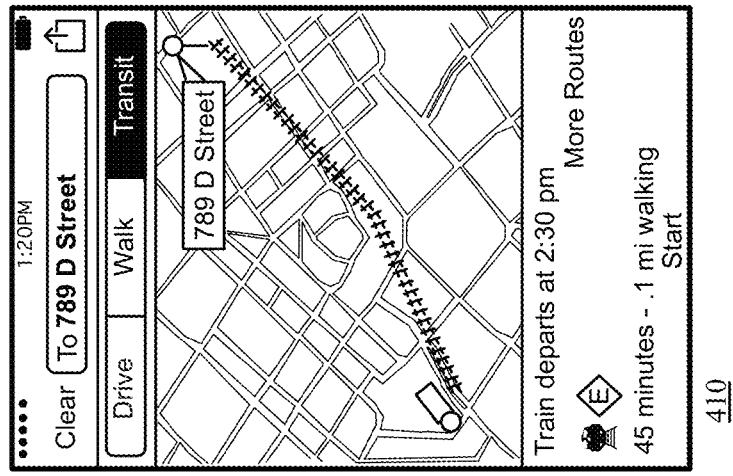
FIG. 4 illustrates the UI of the map application of some embodiments that displays the departure schedule of a train (e.g., a light rail train) from a train station in terms of two different examples.
Figure 4:
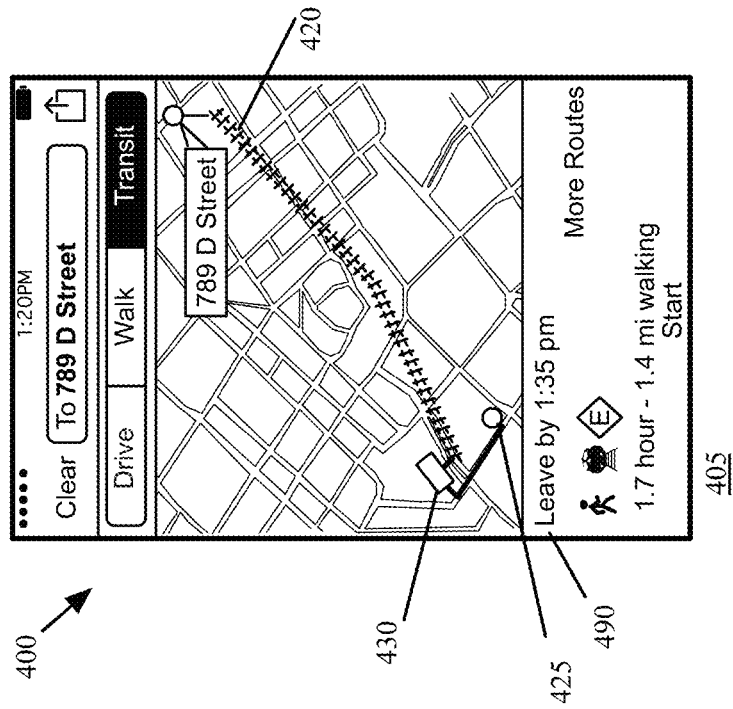

As stated above, in addition to the category of frequency (i.e., high frequency or low frequency), the map application displays the departure schedules of transit lines based on other factors as well. For instance, in some embodiments, the map application displays different formats for departure schedules based on the frequency category as well as the position of the device in relation to the transit station. FIGS. 3 and 4 illustrate different formats of displaying the departure schedules of transit vehicles from a transit station based on the frequency category of the transit vehicles and based on the position of the device. More specifically, FIG. 3 illustrates the UI 300 of the map application of some embodiments that displays the departure schedule of a subway train from a subway station in terms of three different examples 305-315.

In the first example 305, the map application UI 300 shows the best transit route 320 to an address (i.e., 345 B Street) drawn over a presentation of a map in the map presentation area 130. The current device's location 325 is also shown on an area of the map presentation that is relatively far from the subway station 330. The route summary display area 193 displays a walking person representation for the walking leg of the trip and a subway train representation that travels the subway leg of the transit route 320. The display area 193 in this example also shows that the total trip time from the current position of the device to the address is 1.6 hour (1 hour and 36 minutes) which includes a total walking distance of 1.2 miles. The first example 305 further shows that the display area 390 displays a departure schedule of every 5-10 minutes for the subway train line 166 which takes the user (passenger) to the destination address.

The illustrated example shows, in the display area 390, the frequency of departures of the subway trains of line 166. In this example though, the subway train of line 166 is the only high frequency transit vehicle required to reach the destination. Different embodiments show different schedules in the display area 390 based on the number of legs of the trip and based on whether each leg of the tip is traveled by a high frequency transit vehicle or a low frequency transit vehicle. In some embodiments, the map application provides the frequency of departures of the first transit vehicle that travels the first leg of the trip when there is a combination of high and low frequency transit vehicles traveling different legs of the transit route.

In some other embodiments, when all the transit vehicles of the transit route are high frequency transit vehicles, the map application provides a total frequency of departures of the trip. That is, in some such embodiments, the application calculates the transit route frequency based on different sequence of departure gaps in each leg of the transit route, and then provides the transit route frequency (i.e., total frequency of departures of the lines that are used in the transit route) in the display area 390. The method of computation of the departure frequency of a transit route of some embodiments is described in detail below by reference to FIGS. 10 and 11.

The second example 310 of FIG. 3 shows the best transit route 340 to another address (i.e., 567 C Street) drawn over the map presentation in the map presentation area 130. The current device's location 325 in this example, however, is at or very close to the subway station 330. As a result, the route summary display area 193 does not display a walking person representation for any walking leg of the trip. Instead this display area only includes a subway train representation that travels the subway leg of the transit route 340. The display area 193 in this example also shows that the total trip time from the current position of the device to the address is 25 minutes and includes a total walking distance of only 0.1 miles. The second example 310 further shows that the display area 390 displays a departure schedule of every 5 minutes for the subway train line 188 which takes the user (passenger) to the destination address in this example.

The third example 315 shows the same UI of the second example 310 with the same transit route 340 to the same address (i.e., 567 C Street). The current device's location 325 in this example is also at the subway station 330. However, in this example the time of day is 11:30 pm, whereas the time of day in the second example was 1:20 pm. The display area 193 at this example also shows that the total trip time from the current position of the device to the address is 25 minutes and includes a total walking distance of only 0.1 miles. The third example 315, however, shows that the display area 390 now includes a departure schedule of "about every 13 minutes" for the same subway line 188. This is because the subway line at this time of the day has fewer departures from the transit station compares to earlier in the afternoon. The reason for displaying the departure frequencies in a different format in each of the above-described examples (i.e., "every 5-10 minutes," "every 5 minutes," and "about every 13 minutes") is described below in details by reference to FIGS. 7 and 9.

FIG. 4 illustrates the UI 400 of the map application of some embodiments that displays the departure schedule of a train (e.g., a light rail train) from a train station in terms of two different examples 405 and 410. As described above, the map application of some embodiments groups different transit vehicles into high frequency transit vehicles and low frequency transit vehicles. The application looks at the departure intervals of the transit vehicles of a line from a station and if the intervals are greater than a threshold (e.g., 30 minutes), the application groups those transit vehicles as low frequency transit vehicles. In this example, the intervals between departures of every train of line E from the train station is an hour, hence the trains of this line are categorized as low frequency trains.

In the first example 405, the map application UI 400 shows the best transit route 420 to an address (i.e., 789 D Street) drawn over a presentation of a map in the map presentation area 130. The current device's location 425 is also presented on an area of the map presentation that is relatively far from the train station 430. The route summary display area 193 displays a walking person representation for the walking leg of the trip and a train representation that travels the train leg of the transit route 420. The display area 193 in this example also shows that the total trip time from the current position of the device to the address is one hour and 45 minutes which includes a total walking distance of 1.4 miles. The first example 405 further shows that the display area 490 displays the time by which the user should leave the current location of the user (i.e., 1:35 pm) to be able to catch the next train of line E which takes the user (passenger) to the destination address.

As described above, the map application of some embodiments can intelligently guide the user to plan for a transit trip based on the user's location. The map application of some such embodiments first identifies the location of the device on which the application runs. The application then evaluates the distance between the device and the first transit station at which the user boards the first transit vehicle. When the application realized that the user is far away from the transit station (e.g., farther than a threshold distance), the application displays the time by which the user should starts the transit trip (i.e., the user should leave the current location towards the first transit station). On the other hand, when the user is at or near the transit station (e.g., closer than the threshold distance), the application displays the time at which the first transit vehicle of the line leaves the transit station.

The second example 410 shows the same transit route 420 to the destination address as in the first example, drawn over the map presentation. The current device's location 425 is, however, very close to the train station 430 in this example (the device is shown almost at the transit station). The route summary display area 193 does not display a walking person representation in example 410 and only shows the train representation that travels the train leg of the transit route 420. The display area 193 in this example also shows that the total trip time from the current position of the device to the address is 45 minutes which includes a total walking distance of 0.1 miles. The second example 410 further shows that the display area 490 displays the time at which the first train of line E is scheduled to depart from the train station (i.e., 2:30 pm). This is because, in this example, the map application has identified that the user is within the vicinity of the train station and therefore it shows the departure time of the train instead of the time at which the user should leave the her current location.

In addition to providing transit departure schedules in a transit route planning UI such as the display area 190 in the above examples, the map application of some embodiments provide detailed transit information for a particular transit station when the particular transit station is selected. In some embodiments, when a user selects a transit station on a map view (e.g., by tapping on a selectable representation of the station that is displayed on a map presentation), the map application provides a display area (transit placecard) that includes various information about the transit station and the different transit lines that depart from the transit station. For instance, the map application of some such embodiments provides the name and address of the transit station as well as the departure schedule of the different transit lines from the transit station. Transit placecards are further described in the concurrently filed U.S. patent application Ser. No. 14/869,706 entitled "Map application with Transit Navigation Mode", which is incorporated herein by reference.

Figure 5:
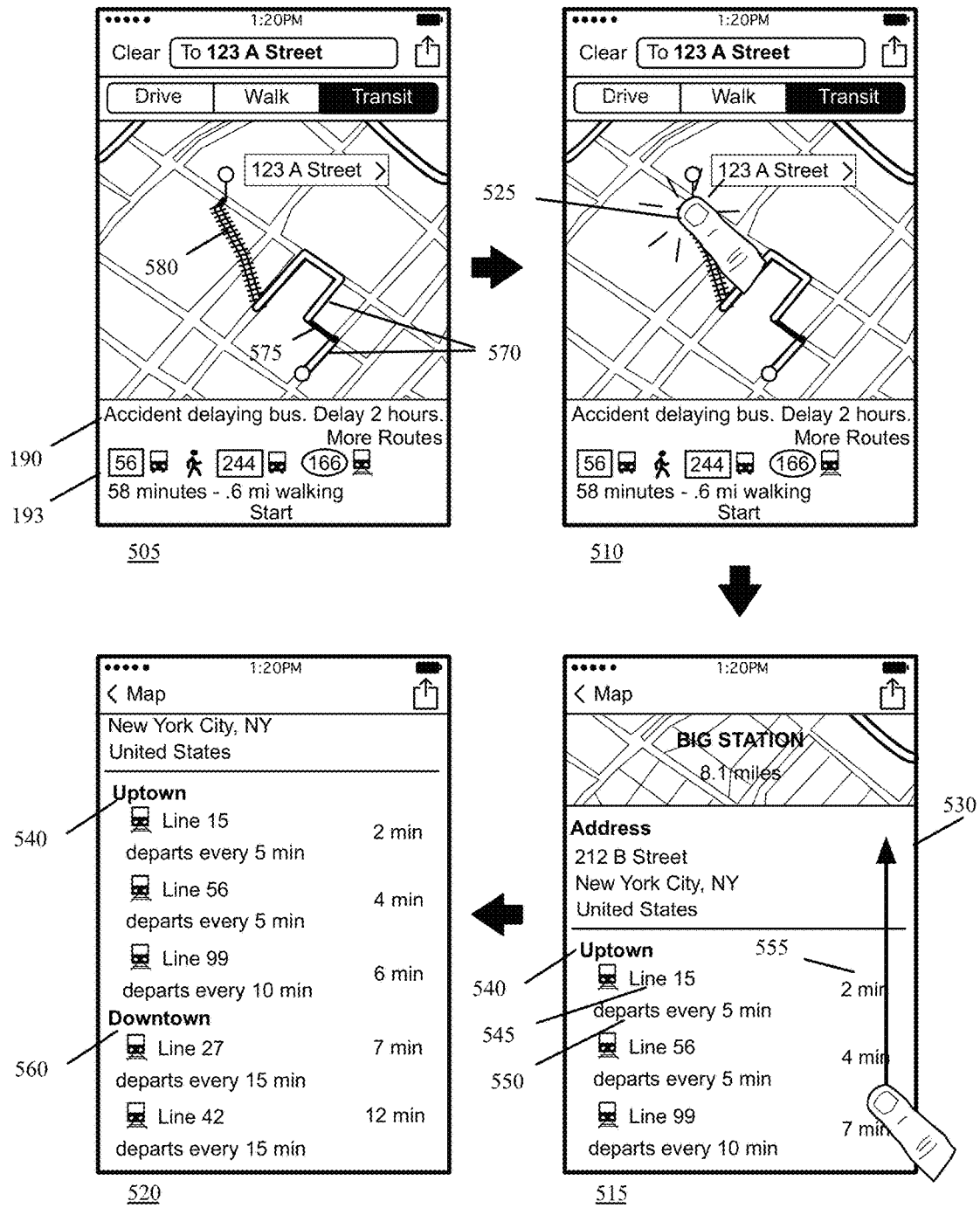
FIG. 5 illustrates how a user can access and view a transit station placecard that provides transit schedules related to the transit station.

FIG. 5 illustrates how a user can access and view a transit station placecard that provides transit schedules related to the transit station. More specifically, this figure shows, through four operational stages 505-520 of the map application UI, a user selecting a particular transit station that is displayed on a map of a geographical area. The user can then view the departure schedule of all of the transit vehicles that stop at the particular transit station. The map application of some embodiments takes into account the locality in which the transit station is located as well as the type of the transit vehicles (e.g., to which transit system the transit vehicles belong) in providing the information in the departure schedule.

The first stage 505 shows a map application UI that includes a representation of the best identified route that is drawn over a portion of the map presentation. The identified transit route includes two different bus legs 570, a walking portion 575, and a subway leg 580. This stage also shows that the route summary display area 193 displays a transit route summary representation that includes a bus representation for the bus of the line 56, a walking person representation for the walking portion, a bus representation for the bus of the line 244, and a subway train representation for the subway leg 580 of the transit route. The incident display area 190 displays an incident report that informs the user an accident is delaying one of the two bus lines used in the transit route.

The second stage 510 shows that the user selects the last transit station 525 of the displayed transit route. In some embodiments each transit station for which a transit station placecard is available is presented on a map with a selectable transit station representation. In some other embodiments, the map application displays a transit station representation for every transit station that is displayed on the map presentation. In yet other embodiments, the map application does not display any transit station representation over the map presentation and selecting the transit station (e.g., by tapping on the display area over the map presentation at or around the area that the transit station is located) would cause the map application to display a transit station placecard for the selected transit station. In some such embodiments, selecting the transit station on the map directs the application to provide a banner similar to the banner displayed for the destination in this stage. The user can then select the transit station placecard by selecting the corresponding control on the banner (e.g., the right arrow depicted on the right hand side of the banner for "123 A Street" destination).

The third stage 515 illustrates that the map application, in response to the selection of the subway station 525, displays a display area 530 for the transit terminal placecard which includes general information about the transit station (i.e., subway station 525) as well as the departure schedule of the transit vehicles (i.e., subway trains) of different lines. Although in the illustrated embodiment, the general information only includes the name and address of the transit station, some other embodiments provide a variety of information about the transit station in the transit station placecard. For instance, the map application of some embodiments provides information such as directions to and/or from the station, images of the station (e.g., from both inside and outside the station), the reviews gathered by information aggregation entities (e.g., Yelp, Facebook, Twitter, etc.) about the transit station, etc.

The third stage also shows the departure schedule for all subway trains that leave the station in the Uptown direction. More specifically, this stage shows a trip heading 540 for all the trains that travel north (i.e., in the Uptown direction), a line number 545 for each train, a frequency of departure 550 of each train, and a countdown 555 to the next scheduled train's departure. The map application of some embodiments identifies a local directional term for every cardinal direction towards which a set of transit vehicles travel (if such a term is available). The map application of some such embodiments identifies these terms based on the geographical area in which the transit station located (e.g., the terms that are used in a certain locality). The map application then displays the identified term as a header for the set of transit vehicles that travel in each particular direction. Labeling transit directions with local directional terms is described in further detail in the concurrently filed U.S. patent application Ser. No. 14/869,403 entitled "Map application with Transit Navigation Mode".

In the illustrated example, the term that is used (e.g., by the passengers and transportation system of this particular geographical area in which the subway station located) for the north is "Uptown." Hence the map application has identified and displayed Uptown as a header for the subway trains that travel northbound from the subway station. Under the header, the map application lists subway trains of the lines that are scheduled to depart from the subway station in the specified direction. That is, the map application of some embodiments displays a list of subway lines, the trains of which will leave the subway station during a certain time period from the current time (e.g., the subway trains that leave the station in the next 15 minutes). In the shown example of stage 515, three different subway trains of the lines 15, 56, and 99 will leave the station in the Uptown direction in the next 7 minutes from the current time of the device (i.e., 1:20 pm).

The frequency of departure 550 of each train in the third stage 515, shows the time intervals at which a next train of the line leaves the subway station. The map application of some embodiments, provides, in the transit placecard of a transit station, a departure time for each transit vehicle of a transit line in a particular format. The map application of some such embodiments categorizes the transit lines into two categories of high frequency transit lines and low frequency transit lines. Depending on the category of the transit line the map application displays the departure time of the transit vehicles of that line in a different format. For a high frequency transit line, the map application displays the departure times in a frequency format, which includes the frequency of departures of the transit vehicles of the line from the station. For a low frequency transit line, the map application displays the departure times of the transit vehicles of the line in an absolute time format, which includes the time at which the transit vehicle leaves the station.

In order to determine whether a transit line is high frequency or low frequency, the map application of some embodiments first evaluates the frequency of departures of the transit vehicles of the line from a transit station. The application then determines whether the evaluated frequency is greater than a threshold (e.g., a predefined time period). When the evaluated frequency is greater than the threshold, the map application of some such embodiments categorizes the transit vehicle as a low frequency transit vehicle. On the other hand, when the evaluated frequency is less than or equal to the threshold, the map application categorizes the transit vehicle as a high frequency transit vehicle.

In the illustrated example, the map application has categorized the subway trains of this line at this particular subway station as high frequency transit vehicles. As such, the departure schedule of the subway train of line 15 is displayed in frequency format (i.e., every 5 minutes). Similarly, the map application has determined that subway trains of the line 99 are high frequency trains at this station. Consequently, the departure schedule of the subway train of line 99, although different from the subway trains of line 15, is displayed in frequency format as well (i.e., every 10 minutes). Some embodiments provide a novel method of calculation of the frequency of departures of the transit vehicles of different lines from different transit stations. The method of calculation of the frequencies of departures of different transit vehicles is also described in details below by reference to FIGS. 7-9.

The third stage 515 further shows a countdown 555 to the next scheduled subway train's departure of each subway line. The map application of some embodiments provides a countdown to the next scheduled transit vehicle's departure in order to provide a more precise time of departure to the user. The combination of the countdown and the frequency provides the user with all the information needed for the departure schedule of a transit vehicle. In other words, a user would realize how long more the user has to wait for the next train of the line by looking at the countdown information. At the same time, the user would know how much more the user has to wait if he misses the next train by looking and the frequency of the departures.

Lastly, the third stage shows that the user is scrolling up the information displayed in the transit station placecard in order to view other transit information provided by the placecard. Consequently, a user, with a glance at the illustrated placecard, would realize that three different subway trains of the lines 15, 56, and 99 will leave the station in the Uptown direction in the next 7 minutes from the current time of the device (i.e., 1:20 pm). The subway trains of subway lines 15 and 56 depart towards Uptown every 5 minutes while the subway trains of the line 99 departs towards Uptown every 10 minutes. The next scheduled departure for the subway line 15 will be in 2 minutes, the next scheduled departure for the subway line 56 will be in 4 minutes, and the next scheduled departure for the subway line 99 will be in 7 minutes.

The fourth stage 520 shows the transit station placecard displaying additional departure information after scrolling the information up. The display screen 530 now displays the Uptown departure schedule under the trip heading 540, as well as the schedule for the subway trains that depart towards Downtown. More specifically, this stage shows a trip heading 560 for all the trains that travel south (i.e., in the Downtown direction), a line number for each train, a frequency of departure of each train, and a countdown to the next scheduled train's departure.

In the illustrated example, the term that is used (e.g., by the passengers of this particular geographical area in which the subway station located) to refer to southbound transit is "Downtown." Therefore, the map application has identified and displayed Downtown as a trip heading for the subway trains that travel in the southbound direction from the subway station (i.e., towards the Downtown geographical region). Under the trip heading, the map application lists subway trains of the lines that are scheduled to depart from the subway station next. That is, the map application of some embodiments displays a list of trains of different lines that will leave the subway station during a certain time period from the current time (e.g., the subway trains that leave the station in the next 15 minutes). In the example shown in stage 520, two different subway trains of the lines 27 and 42 will leave the station towards Downtown in the next 12 minutes from the current time of the device (i.e., 1:20 pm). Both of these subway lines have trains that depart towards Downtown every 15 minutes. The next scheduled departure for the subway line 27 will be in 7 minutes and the next scheduled departure for the subway line 42 will be in 12 minutes.

While the examples shown in this figure involve subway stations and subway trains, one of ordinary skill would realize that the examples are equally applicable to other types of transit stations and other types of transit vehicles (e.g., from different transit systems) as well. For instance, the map application of some embodiments provides a bus stop placecard that provides the schedule for the buses that stop at the bus stop. Similarly, some embodiments provide ferry terminal placecards and rail placecards for ferries and light rails, respectively, with each placecard providing different departure schedule for the respective transit vehicles.

The illustrated example shows a transit station placecard for a subway station in which all the subway trains of different lines are scheduled to depart from the station in short time intervals (e.g., every 15 minutes or less). As such, all the departure schedules are displayed in the frequency formats. As described above, the map application of some embodiments also provides transit station placecards that display departure schedules for low frequency transit vehicles (e.g., transit vehicles that depart from the transit station at longer time intervals such as every 30 minutes or more). The map application of some such embodiments displays the departure schedule differently in such transit station placecards.

As an example, when a user selects a bus stop representation that is displayed on a map presentation of a geographical area provided by the map application, the application provides a bus stop placecard for the selected bus stop. The placecard may then show a departure schedule for two different bus lines from the selected bus stop. The first bus line may include buses that depart from the bus stop with a frequency of every 12 minutes. The second bus line may include buses that depart from the bus stop with a frequency of every 30 minutes.

The map application of some embodiments displays, in the placecard, the first bus line schedule the same way as depicted in stage four of the figure. That is, the map application displays a trip heading for the line, the line number, and a frequency of departure that states "every 12 minutes." For the second line, however, the map application of some embodiments displays the format of departures differently. For example, in some embodiments, the map application displays the trip heading, the line number under the trip heading, and a set of one or more bus representations (e.g., bus logo), with a time of departure in front of each bus representation. The number of bus representations in the set varies in different embodiments. Some embodiments display only the next bus and its time of departure from the bus stop, while other embodiments display a certain number of next scheduled departures.

The above-described example illustrated a transit placecard for a subway station. In some embodiments, a user may select a transit hub representation on a displayed map presentation. A transit hub in some embodiments is a large transportation facility that includes different types of transit stations (e.g., train station, bus stop, subway station, etc.) for different transit vehicles (e.g., light rail trains, buses, subway trains, etc.). Some such embodiments, upon selection of the transit hub representation, provide a transit hub placecard with a scrollable display area that includes the departure schedules of all the different types of transit vehicles from the different types of transit stations. The user may then scroll through the different transit lines for different types of transit vehicles to view the desired transit station and the departure schedules of the transit vehicles from the desired transit station.

Figure 6:
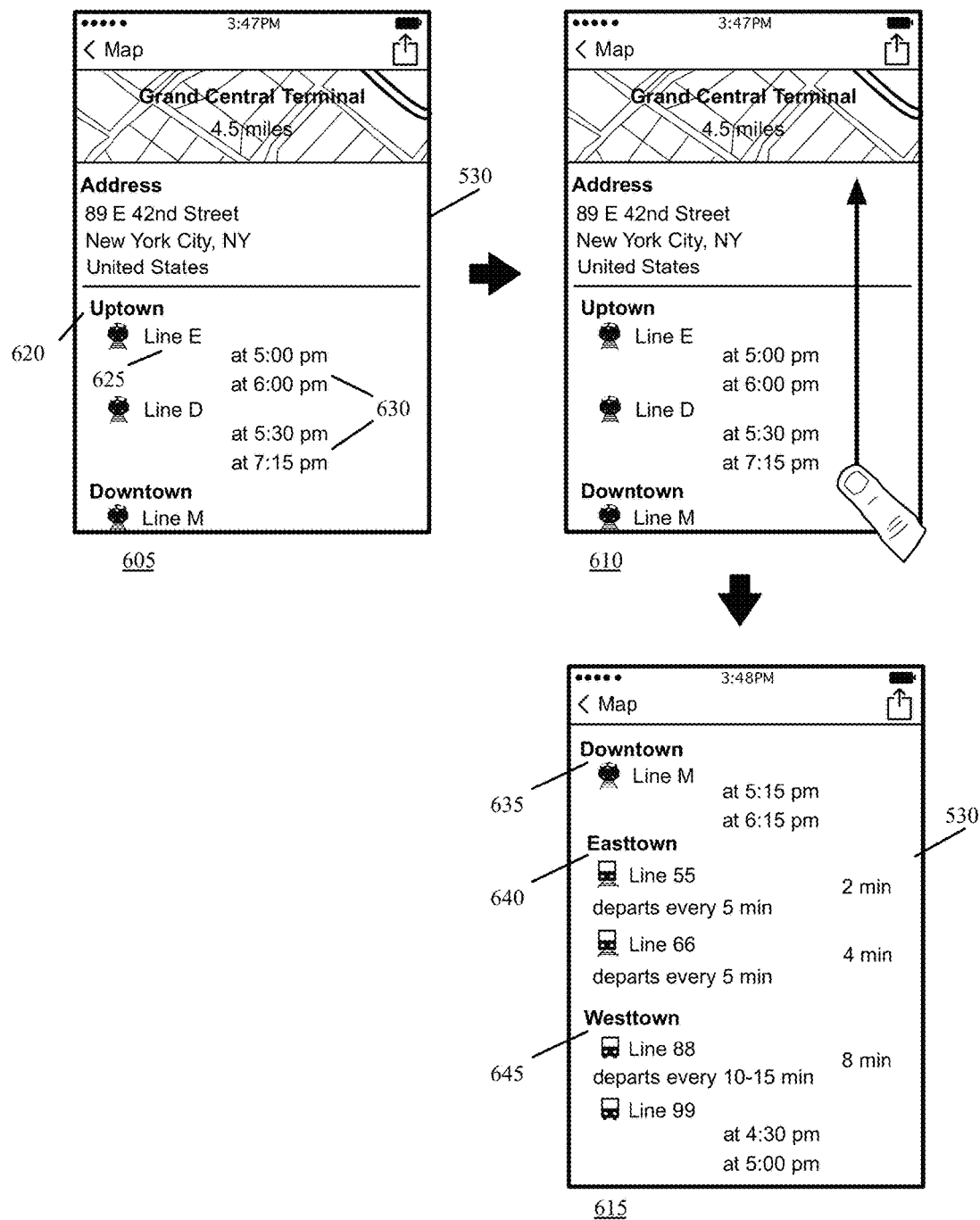
FIG. 6 illustrates an example of a transit hub placecard that provides transit schedules for different types of transit vehicles and transit lines departing from the transit hub.

FIG. 6 illustrates an example of a transit hub placecard that provides transit schedules for different types of transit vehicles and transit lines departing from the transit hub. Specifically, this figure shows, through three operational stages 605-615 of the map application UI, the transit hub placecard and user interaction with the placecard to view more information about the different transit lines' departure schedule from the transit hub.

The first stage 605 illustrates that the map application displays, in the transit placecard display area 530, general information about a transit hub as well as the departure schedule of different transit vehicles (i.e., rail trains) of different lines. The placecard display area can be displayed for example in response to a selection of the transit hub representation on a map presentation similar to the example shown in FIG. 5. Although in the illustrated example, the general information about the transit hub only includes the name and address of the hub, some embodiments provide a variety of information about the transit hub in the transit station placecard. For instance, the map application of some embodiments provides information such as directions to and/or from the station, images of the station (e.g., from both inside and outside the station), the reviews gathered by information aggregation entities (e.g., Yelp, Facebook, Twitter, etc.) about the transit station, etc.

The first stage also shows the departure schedule for all trains that leave the hub in the Uptown direction. More specifically, this stage shows a trip heading 620 for all the trains that travel north (i.e., in the Uptown direction), a line number 625 for each train, and the departure times 630 of each train of each line. Similar to the last example, in the illustrated example, the term that is used (e.g., by the passengers and transportation system of this particular geographical area in which the subway station located) for the north is "Uptown." Hence the map application has identified and displayed Uptown as a header for the trains that travel northbound from the subway station. Under the header, the map application lists the different train lines that are scheduled to depart from the hub in the specified direction. In the shown example of stage 605, two different train lines E and D will leave the station in the Uptown direction.

Unlike the previous example though, the departure schedule of the train lines are not shown in frequency format. This is because these train lines are categorized as low frequency transit lines and as such their departure times are displayed in absolute times. That is, for each train line, the map application displays the time at which the next available train of the line leaves the station. In some embodiments, for low frequency transit vehicles, the map application displays the time of departure of a next certain number of transit vehicles.

In the illustrated example, for each line, the map application shows the next two departure times. One of ordinary skill in the art would realize that different embodiments may show different number of departures for each line (e.g., the next three departures, the next four departures, etc.). The second stage 610 shows that the user is scrolling up the information displayed in the transit station placecard in order to view other transit information provided by the placecard. In the illustrated example, the current time shown on the device is 3:47 pm and therefore the map application displays the next available departure time for the line E at 5:00 pm and after that there is no other train departing in Downtown direction until 6:00 pm. Similarly, the next available departure time for the train line D is at 5:30 pm and after that there is no other train departing in Downtown direction for this line until 7:15 pm.

The third stage 515 shows the transit hub placecard displaying additional departure information after scrolling the information up. The display screen 530 now displays the Downtown departure schedule under the trip heading 635 for the train lines that depart towards Downtown (the local directional term for trains that travel southbound), the Easttown departure schedule under the trip heading 640 for the subway lines that depart towards Easttown (the local directional term for East in this locality), and the Westtown departure schedule under the trip heading 645 for the bus lines that depart towards Westtown (the local directional term for west in the locality).

In the illustrated example, the subway trains of the lines 55 and 66 are listed under the trip header Easttown which shows that these lines are scheduled to depart from the subway station every 5 minutes. This is because these subway lines are categorized by the map application (or a mapping service that provides these information to the mapping application) as high frequency lines. The next scheduled departure for the subway line 55 will be in 2 minutes while the next scheduled departure for the subway line 66 will be in 4 minutes. The third stage 615 also shows that the buses of the lines 88 and 99 are listed under the trip header Westtown which shows that these bus lines depart in the west direction from this transit hub. However, as shown, the bus line 88 is categorized as a high frequency bus line and as such the departure schedule for this line is displayed in frequency format in the placecard, while the bus line 99 is categorized as a low frequency bus line and as such the departure schedule for this line is displayed in absolute time format (i.e., the time at which the next bus/buses of the line leave the transit hub).

III. Computing Departure Frequencies

As described above, the mapping service of some embodiments calculates the frequency of departures of high frequency transit vehicles of a transit line and then displays the calculated frequency. In order to calculate the frequency of departures, the mapping service of some embodiments uses a novel method that receives a transit line's departure schedule (e.g., a departure timetable of the transit line) for a particular route of the line and produces frequencies of departure of the line at each station along the particular route for any given time and day. The received departure schedule of the route in some embodiments includes the departure times of the transit vehicles of the line at each transit station of the particular route during a particular time period (e.g., a day, a week, a month, etc.).

The method first generates a window group for each departure time of the line at a particular station. In some embodiments each window group includes a sequence of departure times that starts with the corresponding departure time at the station and continues with the departure times that are after the corresponding departure time, up to a reasonable time bound into the future. The time bound in some embodiments can be set to include at least L departures times (e.g., 4 departure times) and at most H departure times (e.g., 10 departure times), such that the last departure time is no more than T hours (e.g., 2 hours) into the future with respect to the start time.

For example, when the departure times for the bus line X at the bus stop Y are "4:49, 5:04, 5:19, 5:34, 6:04, 6:19, 6:34, 6:49, 7:04, 7:19," the window group for the departure time 4:49 at the station includes the departure times "4:49, 5:04, 5:19, 5:34, 6:04, 6:19, 6:34," which is between four and ten departure times and at the same time the latest time in the group is not more than two hours from the start time. Similarly, the window group for the departure time 5:04 at the station includes the departure times "5:04, 5:19, 5:34, 6:04, 6:19, 6:34, 6:49, 7:04," and the window group for departure time 5:19 would include "5:19, 5:34, 6:04, 6:19, 6:34, 6:49, 7:04, 7:19," and so on.

The method of some embodiments does not generate a window group when no such contiguous subsequence is feasible (i.e., the subsequence of departure times). In some embodiments the subsequence is not feasible when the departure schedule data is not available or the departure times at the station are drastically different (e.g., there are two departures in the morning and three departures in the evening). In some other embodiments, the method generates an empty window group when no such contiguous subsequence is feasible. Each generated window group (i.e., for each associated departure time at the station) is then processed independently by the method of some embodiments.

The method processes each window group by approximating the sequence in each window group using a single number that expresses the gaps in the departure sequence (i.e., the intervals between each consecutive pair of departures), or a pair of numbers that expresses a range of gaps in the departure sequence. The size of the expression generated by the method of some embodiments is independent of the departure sequence size. Therefore the resulting expression succinctly expresses the sequence.

Figure 7:
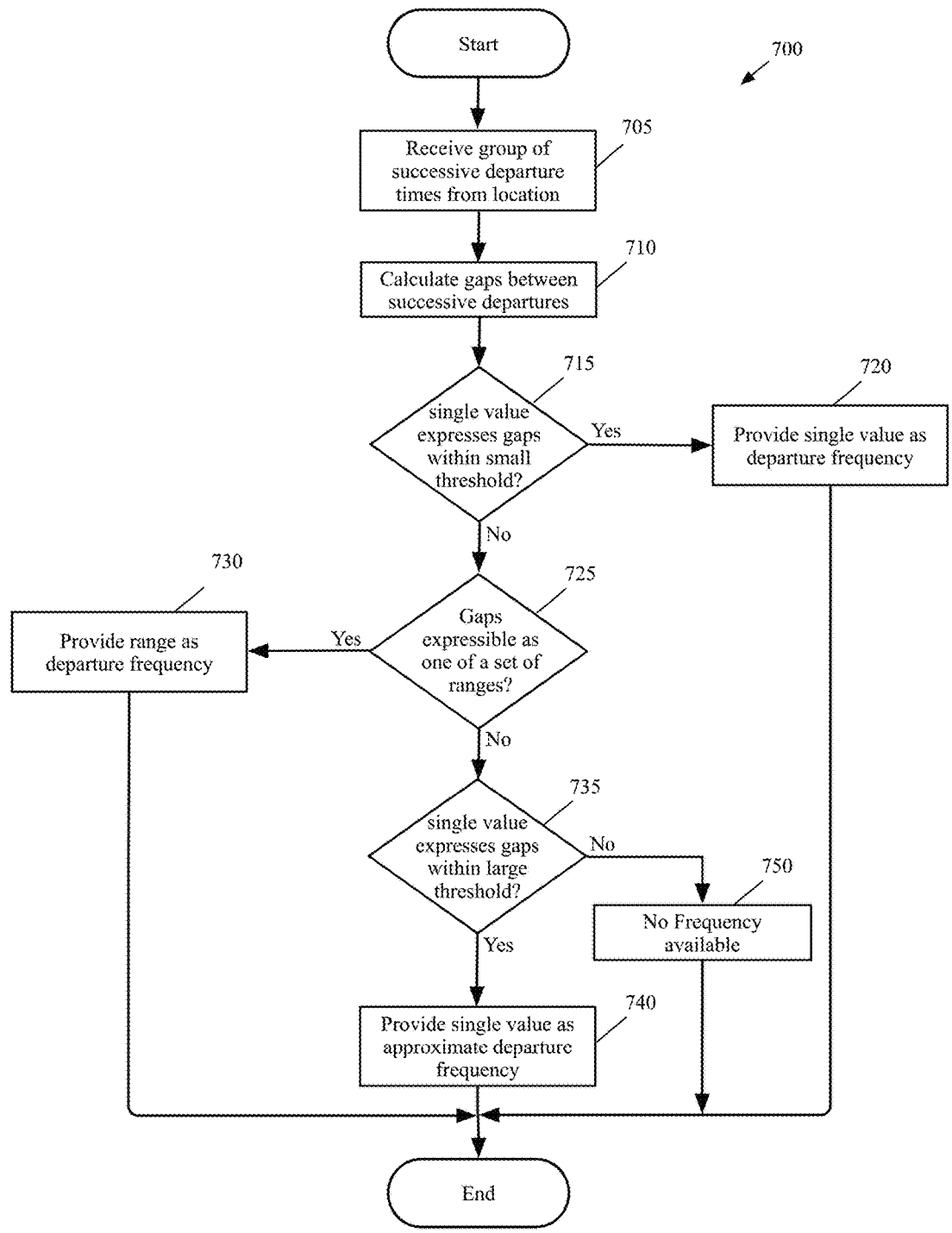
FIG. 7 conceptually illustrates a process that some embodiments perform to determine how to express (present) the departure schedule of a high frequency transit line.

The method of some embodiments tries to express the sequence of gaps (intervals between departures) with respect to a specification that includes several thresholds that are used to determine whether the collection of successive gaps in the departure times can be expressed by (1) a single exact number, (2) a single approximate number, or (3) a pair of numbers that describes the range of gaps between successive departure times. FIG. 7 conceptually illustrates a process 700 that some embodiments perform to determine how to express (present) the departure schedule of a high frequency transit line. Specifically, the process 700 determines whether to express the departure intervals with an exact number, an approximate number, or a range of numbers. It should be understood that the process 700 is only one such possible process, and that different embodiments may use variations on this process. For instance, some embodiments do not differentiate between expressing the departure intervals as an exact number or an approximate number, and instead only determine whether to express these intervals as a single number or a range of numbers.

In some embodiments a mapping service that runs on one or more dedicated servers performs the process and stores the results to be sent to the map application or returns the results in real time (i.e., upon request) to the map application. In some other embodiments, the process is performed by a map application that executes on a device. In some embodiments, the process is performed by a mapping service that runs on one or more servers and provides the transit data (e.g., routing, navigation, incidents, direction labeling, etc.) to the map application. In some other embodiments, the process is performed by one or more servers that are designated specifically for computing departure frequencies. In some embodiments, the server pre-computes the departure frequencies of different transit lines and upon startup loads the pre-computed frequencies into memory (e.g., volatile memory, etc.) and organizes the frequencies in the memory.

In some such embodiments a map application sends a request for the departure schedule of a transit line to the server. The request for the departure schedule in some embodiments specifies the transit line, the transit station from which the transit vehicles of the transit line depart, the particular time for which the schedule is needed, and the trip heading of the line at the transit station. Upon receipt of such a request, the server retrieves the related contiguous group of frequencies of departures from the memory and sends the retrieved group back to the requesting map application. In some embodiments, the server also sends back a particular number of frequencies of departures corresponding to near future times of the requested time to the requesting map application.

Figure 8:
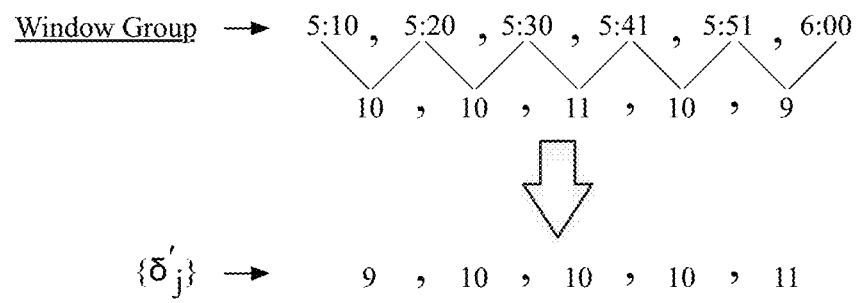
FIG. 8 provides an example for calculating a range of departures as the departure schedule of a transit line at a particular station.
Figure 8:
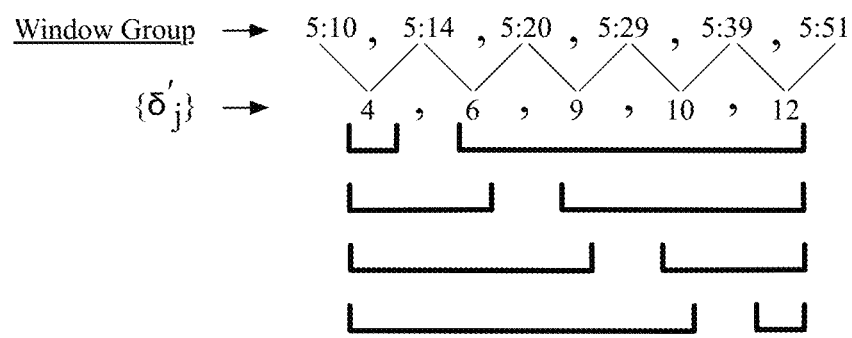

The process 700 is described by reference to FIG. 8, which provides an example for calculating a range of departures as the departure schedule of a transit line at a particular station. The process 700 begins by receiving (at 705) a window group that includes a sequence of departure times of transit vehicles of a transit line that head in the same direction from a particular transit station during a certain period of time. In FIG. 8 the window group is shown as a sequence of departure times "5:10, 5:20, 5:30, 5:41, 5:51, and 6:00." These departure times correspond for example to departure times of a subway line at a particular subway station within one hour.

In some embodiments the window group is generated from a departure schedule of a line (e.g., departure timetable) for a particular route as discussed above. Some embodiments receive the schedule for the line, among a collection of departure schedules for a collection of transit lines, from one or more transit service data providers. Some such embodiments store the received transit data and update the stored data periodically. Some other embodiments update the stored transit data when the updates are available by the transit service data providers.

The process 700 then calculates (at 710) the gaps between the successive departure times of the transit line in the window group. In other words, the process calculates a sequence of differences between successive departure times in the window group, $\Delta=\{\delta'_j\}$, where each $\delta'_j=t_{j+1}-t_j$. As illustrated in FIG. 8, the sequence of gaps for the window group shown in this figure is "10, 10, 11, 10, and 9." After calculating the gaps, the process of some embodiments sorts the calculated sequence of the gaps. Therefore, in this example, the process generates a sorted sequence of the gaps such as $\Delta = \langle 9, 10, 10, 10, 11 \rangle$.

The process then determines (at 715) whether a single value accurately expresses the calculated sequence corresponding to the departure times in the window group. That is, the process determines whether a single number within a small threshold expresses the sequence. The process of some embodiments makes such a determination with respect to an input parameter, $\sigma_e$. The process examines the variance of the set $\Delta$ and determines whether the variance is at most $\sigma_e^2$. When the variance is less or equal to $\sigma_e^2$, the process determines that the mean departure frequency ($\mu(\Delta)$) expresses the gaps exactly and returns (at 720) the variance as a single value that represents the departure frequency. That is, when the process determines that the departure gaps are within a small threshold deviation of a mean time gap, the process returns the mean time gap as the departure frequency of the transit line.

In the example shown in FIG. 8, the variance is 0.4 minutes. That is, as long as the threshold $\sigma_e$ is greater than 0.4, the process returns the mean departure gap of "10" as the departure frequency for this window group. That is, the departure frequency of this subway line is "every 10 minutes." One of ordinary skill in the art would realize that the numbers given in this example (and other examples) are only exemplary and the real numbers are in fact different. For instance the threshold that is used by the process could be significantly smaller than 0.4 in some embodiments. While this example uses a fixed threshold, some embodiments vary the threshold with the mean of the departure gaps. Thus, larger gaps (e.g., every 30 or 60 minutes) will have larger allowable variances, to comport with common thinking. For instance, departure gaps of 40 to 50 minutes might be commonly expressed as "every 45 minutes", whereas departure gaps of 5 to 15 minutes would not be commonly expressed as "every 10 minutes". In addition, some embodiments may vary the threshold based on other variables, such as the geographic area (e.g., different threshold variances may be allowed based on how tightly the transit lines tend to stick to their schedules).

In other embodiments, the process makes the determination as to whether to express the sequence of departure times with respect to two input parameters, $\varepsilon_1$ and $\lambda$. The process, in this case, approximates the distribution of the set $\Delta$ with a univariate Gaussian, $N(\mu, \sigma)$, and then determines whether $\int_{(1-\varepsilon)\mu}^{(1+\varepsilon)\mu} N(\mu, \sigma)dx > \lambda$. The input parameters are defined such that $0 \leq \varepsilon_1$ and $\lambda \leq 1$. Some embodiments, as an example, use $\varepsilon_1 = 0.1$ and $\lambda = 0.7$.

On the other hand, when the process is unable to express the sequence of gaps exactly, the process determines (at 725) whether one of a set of ranges can express the calculated sequence. Specifically, the process determines whether the sequence can be expressed by a pair of deltas from amongst a canonical set of ranges, C. In some embodiments, C is a hand-curated collection of univariate pairs of Gaussian distributions that is defined by $C = \{(N_i^l(\mu_i^l, \sigma_i^l), N_i^h(\mu_i^h, \sigma_i^h))\}_i^K = 1$, with the first Gaussian in the pair expressing the low range, and the second Gaussian expressing the high range. The hand-curated collection of pairs of some embodiments includes a set of predefined pairs (e.g., "2-3, 2-5, 5-7, 5-10, 10-15, 10-20, 15-20, . . . ") that could be used as candidate pairs for computing the range. In addition, corresponding to each i from 1 to K, there is also a pair of display frequencies, which are the actual low and high frequencies for display purposes. Thus, for example, the set of pairs of Gaussian distributions might include the pair (4, 11) as the means corresponding to the Gaussian pair, but with a corresponding pair of display frequencies (5, 10), such that the displayed frequency would be "every 5 to 10 minutes" rather than "every 4 to 11 minutes".

Some embodiments distinguish between the case in which the distribution of the departure gaps can be approximated well by a pair of well-separated univariate Gaussians in the set of canonical Gaussian pairs, and the case where the minimum and maximum of the distribution can be approximated well by a pair of means from among the set of canonical Gaussian pairs. In some embodiments, the process first attempts to find a Gaussian pair, and only if this fails, then attempts to find a best pair of means that approximate the minimum and maximum of the intervals.

In order to attempt to find a pair of well-separated univariate Gaussians in the set of canonical pairs, the process of some embodiments defines a set of feasible solutions, and then optimizes the defined set of solutions. To do so, the process tries all possible bi-partitions of the sorted sequence, $\Delta = \{\delta'_j\}$. The second window group of FIG. 8 is a sequence of departure times "5:10, 5:14, 5:20, 5:29, 5:39, and 5:51." Therefore, the sequence of gaps for this window group in the figure is "4, 6, 9, 10, and 12." The possible bi-partitions of the sequence as shown in FIG. 8 are (4; 6, 9, 10, 12), (4, 6; 9, 10, 12), (4, 6, 9; 10, 12), and (4, 6, 9, 10; 12).

One of ordinary skill in the art would realize that the departure times given in this example are only exemplary and the real departure times could be in fact different. In other words, the departure times in the example are selected in such a way to render a sorted sequence of gaps for simplicity of description and a sequence of real departure times may render an unsorted list of gaps between the successive departures. Some embodiments, as described above, sort the sequence of gaps (e.g., from the lowest number to the highest) after calculating the gaps in the sequence of departures.

Each bi-partition, in some embodiments, includes a set of small deltas and large deltas. The process interprets the associated deltas as a Gaussian. Thus, for each bi-partition, the process generates a pair of Gaussians, one of which describes the set of small deltas, and the other one describes the set of large deltas. For each such choice, the process finds a set of feasible Gaussian pairs from amongst the canonical set of Gaussian pairs, C. For the pair of Gaussians corresponding to the partition, $(N_i^l, N_i^h)$, and a candidate canonical Gaussian pair, $(N_c^l, N_c^h)$, the process determines that the candidate is feasible if $N_i^l$ is "well inside" $N_c^l$ and $N_i^h$ is "well inside" $N_c^h$. This notion of "well-inside" is expressed by a parameter.

For the set of feasible solutions thus defined, the process picks a feasible canonical candidate whose average statistical distance is the smallest, over the low and the high deltas. In the above example, the process would determine that the bi-partition (4, 6; 9, 10, 12) could fit well inside the candidate range of 5-10 minutes and therefore the process returns the departure range as being between 5-10 minutes. Specifically, the first group (4, 6) has a mean of 5 and a variance of $\sigma^2$ of 1, while the second group (9, 10, 12) has a mean of 10.3 and a variance of $\sigma^2$ of 1.6. Again, the numbers are exemplary and the real number and values that are used in these distributions and formulas may be significantly different than the number and values illustrated in the above and below examples.

The process of some embodiments uses the standard concept of Hellinger Distance between a pair of Gaussians.

One of ordinary skill in the art would realize, however, that other appropriate forms of statistical distances between a pair of Gaussians could be equally applicable. Algorithm 1 below describes this accurately. Some notations are abused to let Δ also denote the sorted sequence corresponding to the set Δ, that is Δ[i]≤Δ[j], i<j, for the sake of notational convenience. Also, in Algorithm 1, Δ[i . . . j],1≤i≤j≤L denotes the consecutive subsequence of Δ between i and j.

---
Algorithm 1: FindBestGaussianPair(Δ[1 . . . L], C)
---
closest ← ∞
for i ← 1:L do
   $N_i^l ← (\mu_i(\Delta[1...i]), \sigma_i(\Delta[1...i]))$
   $N_i^h ← (\mu_i(\Delta[i+1...L]), \sigma_i(\Delta[i+1...L]))$
   $F_i ← \{(N_c^l, N_c^h) : d_1(N_i^l, N_c^l) < \varepsilon_2, d_1(N_i^h, N_c^h) < \varepsilon_2, (N_c^l, N_c^h) \in C\}$
   $(N_c^l, N_c^h) ← \text{argmin}_{c \in F_i} \{d_2(N_i^l, N_c^l) + d_2(N_i^h, N_c^h)\}$
   if $d_2(N_i^l, N_c^l) + d_2(N_i^h, N_c^h) <$ closest then
     closest ← $d_2(N_i^l, N_c^l) + d_2(N_i^h, N_c^h)$
     $(N_o^l, N_o^h) ← (N_c^l, N_c^h)$
if closest < ∞ then
   return $(N_o^l, N_o^h)$
return 0
---

Some embodiments use 0.05 for the value of $\varepsilon_2$ in the above algorithm. In the above Algorithm 1, d2(.,.) is the Hellinger Distance between two Gaussians. In Algorithm 2 below, d1(.,.) is defined.

---
Algorithm 2: $d_1(N_a, N_b)$
---
$l_a ← \mu_a - \sigma_a$
$h_a ← \mu_a + \sigma_a$
$l_b ← \mu_b - \sigma_b$
$h_b ← \mu_b + \sigma_b$
if $(l_a, h_a)$ and $(l_b, h_b)$ do not overlap then
   return 1
$S ← (\min\{h_a, h_b\} - \max\{l_a, l_b\}) / (h_a - l_a)$
return 1−S
---

In the above Algorithm 2, in order to prevent the result of $h_a - l_a$ from being zero and hence S being undefined, some embodiments, subtract a small value (ε') from $l_a$ and add the same small value to $h_a$ at the beginning of the algorithm. The same small value (ε') is also added to and subtracted from $h_b$ and $l_b$, respectively.

When the distribution cannot be approximated using a pair of Gaussians from the canonical set, the process attempts to find a Gaussian pair among the canonical set such that the pair of means "fits" the minimum and maximum values of the distribution well. Basically, this operation compares the minimum and maximum values with the low and high means from amongst the set of canonical Gaussian pairs. For a fixed pair of Gaussians, $(N_c^l, N_c^h)$, from the set of canonical Gaussian pairs C, the low and high means are denoted by $\mu_c^{(l)}$, $\mu_c^{(h)}$ respectively. The process denotes a pair of means $(\mu_c^{(l)}, \mu_c^{(h)})$ as feasible for the minimum and maximum values of the distribution (denoted as (min, max)) if and only if $\min \in (1 \pm \varepsilon_3) \mu_c^{(l)}$ and $\max \in (1 \pm \varepsilon_3) \mu_c^{(h)}$. Some embodiments use 0.2 for the value of ε1. Using the value F to denote the subset of such qualifying pairs for (min, max), the process of some embodiments selects a pair for which the average distance to (min, max) is the smallest. This process is described by the following Algorithm 3:

---
Algorithm 3: FindBestMeanPairforMinMax(Δ[1 . . . L], C)
---
$(\min, \max) ← (\min(\Delta), \max(\Delta))$
$\mathcal{F} ← \{(\mu_c^{(l)}, \mu_c^{(h)}) : \min \in (1 \pm \varepsilon_3) \mu(N_c^l),$
$\max \in (1 \pm \varepsilon_3) \mu(N_c^h), (N_c^l, N_c^h) \in C \}$
$(\alpha, \beta) ← \text{argmin}_{c \in \mathcal{F}} \{|\mu_c^{(l)} - \min| + |\mu_c^{(h)} - \max|\}$
return $(\alpha, \beta)$
---

When the process determines that one of the pair of deltas (i.e., one of the pairs in the set C) as described above (either a pair of Gaussians, or a pair of means) expresses the gaps, the process returns (at 730) the pair as the range of departure frequency. On the other hand, when the process is unable to express the sequence of gaps using one of the pairs in the set C, the process determines (at 735) whether a single value approximately expresses the gaps, $\Delta = \{\delta'_j\}$ corresponding to the departure times in the window group. That is, the process determines whether a single number within a large threshold expresses the sequence. The process of some embodiments makes such a determination with respect to an input parameter, $\sigma_a$, which is greater than the input parameter $\sigma_e$ ($\sigma_a > \sigma_e$). The process of some such embodiments examines the variance of Δ and determines whether the variance is at most $\sigma_a^2$. When the process determines that the variance is less or equal to $\sigma_a^2$, the process realizes that the mean departure frequency ($\mu(\Delta)$) expresses the gaps approximately and returns the variance (at 740) as a single value that represents the approximate departure frequency. In some embodiments, when the process determines that the variance does not express the gap approximately, the process returns (at 750) a variable (e.g., a zero) that shows no frequency can be determined for the departures. Other embodiments do not differentiate between an exact single value and an approximate single value.

The map application of some embodiment deploys this process or a process similar to this to calculate the frequency of departures of a high frequency transit line upon a request. For instance when the map application receives a request for a placecard of a transit station, it calculates the departure frequencies of the different transit lines departing from the transit station and provides the departure frequencies in the placecard, as discussed above. Or when the map application receives a request for a navigation presentation, the application calculates and displays the departure frequencies in the corresponding navigation banners. In some other embodiments, when a map application receives a request for a departure schedule (e.g., to be displayed in a placecard, a navigation banner, etc.), the application sends a request to one or more servers that are dedicated for frequency schedules and calculations and receives the requested information back from those servers.

The servers of some such embodiments calculate the departure frequencies when they receive a request from the map application. Alternatively, or conjunctively, the dedicated servers pre-calculate the frequency schedules (e.g., after receiving a new or updated set of departure timetables) and store the calculated frequencies in one or more data storages for later use (e.g., to be displayed in different user interfaces of the map application). Upon receiving the request for departure schedules from a map application, these servers retrieve the related stored schedules and send them to the requesting map application.

Figure 9:
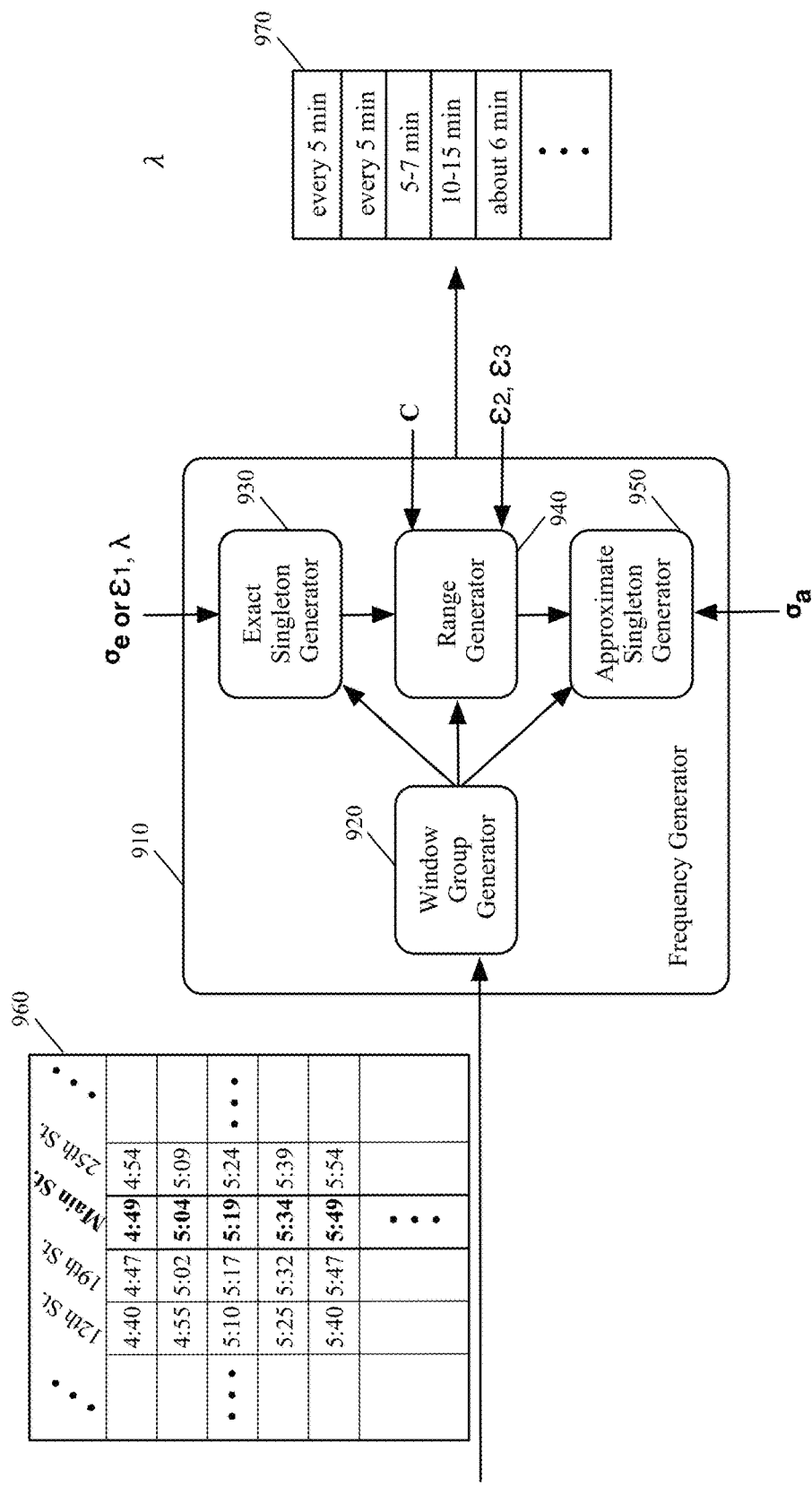
FIG. 9 conceptually illustrates a frequency generator module that some embodiments use for determining in which format the frequency of departures should be displayed for a particular transit line leaving a particular transit station at a particular time of day.

FIG. 9 conceptually illustrates a frequency generator module that some embodiments use for determining in which format the frequency of departures should be displayed for a particular transit line leaving a particular transit station at a particular time of day. More specifically, the frequency generator module determines which one of the above three expressions can be applied to the sequence of the departure gaps. As shown, the frequency generator module of some embodiments includes several other modules which are a window group generator module 920, an exact singleton generator module 930, a range generator module 940, and an approximate singleton generator module 950.

The frequency generator module 910 receives a departure timetable 960 as an input. The timetable in some embodiments is one of a collection of timetables that the module receives from one or more transit data providers. As shown in the figure, the timetable 960 includes a set of columns and a set of rows. The columns of the timetable correspond to the transit stations at which the transit vehicles of the transit line stops. The rows of the timetable correspond to a sequence of departure times of the transit vehicles of the transit line at each transit station. For example the first row shows the departure times of the first bus of the line at each bus stop, the second row shows the departure times of the second bus of the line at the bus stops, and so on.

The window group generator module of the frequency generator module receives the timetable and as described above, iteratively generates a window group for each departure time of a column of the timetable (e.g., the highlighted column for the bus stop of Main Street). For each transit station column then, the frequency generator module outputs a column with multiple cells that each includes a departure frequency for each corresponding cell of the transit station column. Each cell of the output column represents the frequency of departures for the next transit vehicle of the line and can be in one of the three above-described formats (i.e., exact time, approximate time, or a time range).

As shown in the figure, the output column 970 which corresponds to the departure frequency of the highlighted column of the timetable 960 (for the Main Street stop) has several cells. The two first cells of the column show that the departure frequencies for the first and second buses of the line at Main station are every 5 minutes (i.e., the time interval between each pair of departures of the line at this station is 5 minutes). The third cell of the column shows that the departure frequency for the third bus of the line at Main station is between 5-7 minutes while the fourth cell shows that the departure frequency for the fourth bus is between 10-15 minutes. Finally, the fifth cell of the column shows that the departure frequency for the fifth bus of the line at Main station is between approximately about 6 minutes.

In order to produce this output, the frequency generator module of some embodiments, for each generated window group that corresponds to a departure time of the line, computes the differences between successive cells of the window group ($\delta'_j = t_{j+1} - t_j$) and generates a sequence of time gaps ($\{\delta'_j\}$). The sequence is then fed into the exact singleton generator module 930 along with an input parameter $\sigma_e$. The exact singleton generator, as described above, examines the variance of $\Delta$ in the sequence and determines whether the variance is at most $\sigma_e^2$. When the module determines that the variance is less or equal to $\sigma_e^2$, it renders the variance as the exact frequency of departures.

When such determination is not feasible, the next module, which is the range generator module 950, starts to determine whether the generated sequence of gaps can be expressed by a pair of deltas from amongst a canonical set of ranges, C. The module receives the sequence ($\{\delta'_j\}$) along with a canonical set C ($\{(N_i^l(\mu_i^l, \sigma_i^l), N_i^h(\mu_i^h, \sigma_i^h))\}_{i=1}^K$) and parameters $\epsilon_2$ and $\epsilon_3$ (e.g., 0.05 and 0.2). As described above, the range generator module then tries to separate the sequence into two Gaussians that best fit an element of the canonical set C.

When such determination is not feasible either, the next module, which is the approximate singleton generator module 950, starts to determine whether a single number can approximate the generated sequence of gaps $\{\delta'_j\}$ with respect to an input parameter $\sigma_a$ that the module receives. In some embodiments the input parameter $\sigma_a$ is greater than the input parameter $\sigma_e$. The approximate singleton generator module examines the variance of $\Delta$ in the sequence and determines whether the variance is at most $\sigma_a^2$. When the module determines that the variance is less or equal to $\sigma_a^2$, it returns the variance as a singleton that approximately represents the departure frequency. In other embodiments, the exact and approximate singleton generators are a single module that uses the parameters $\epsilon_1$ and $\lambda$ as inputs, as described above.

All the frequency schedules that are described thus far are schedule (or departure) frequencies. In other words, the above-described frequencies are departure frequencies of the transit vehicles of a particular transit line that depart from a particular transit station. The map application of some embodiment also displays a transit frequency or route frequency for a selected transit route that includes multiple legs from a starting location to a destination. Each leg of a selected transit route either uses a different transit vehicle or is a "walk" directive through a navigable pedestrian network.

The map application of some embodiments can also calculate and provide an overall transit frequency (or request the calculation of such from a mapping service running on one or more dedicated servers) and display the calculate frequency when all the legs of the transit route are serviced by high frequency transit vehicles. In some other embodiments, the map application calculates (or requests the calculation) and displays the transit frequency for a transit route even when the transit vehicles of the different legs of the transit route are a combination of high frequency and low frequency transit vehicles.

Figure 10:
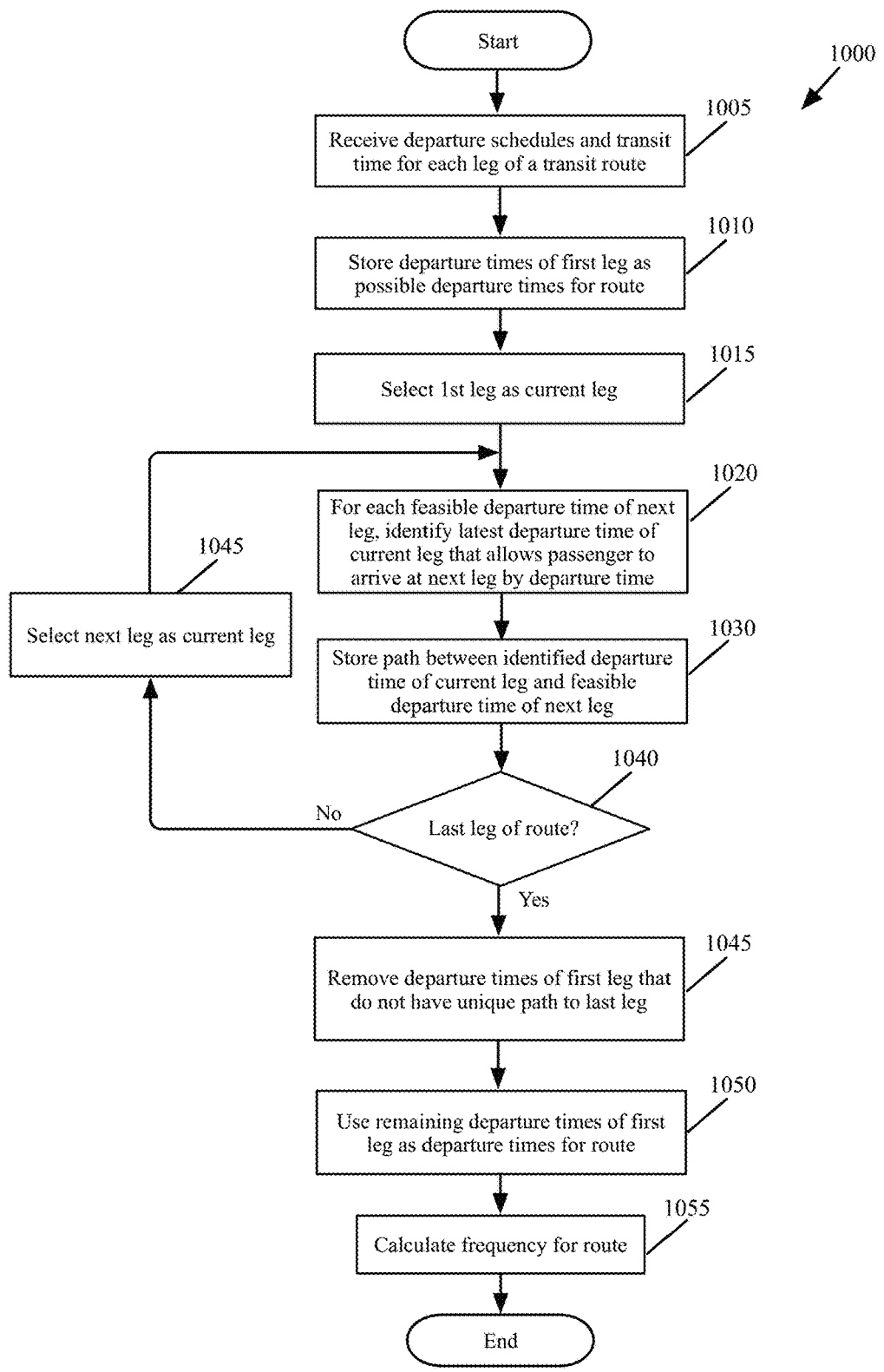
FIG. 10 conceptually illustrates a process that some embodiments perform to calculate the overall transit frequency for a selected transit route.

FIG. 10 conceptually illustrates a process 1000 that some embodiments perform to calculate the overall transit frequency for a selected transit route. Specifically, the process 1000 generates a window group for the transit route that can be used as an input for the process described above by reference to FIG. 7 in order to generate the transit route's frequency. The computed window group for the transit route includes a sequence of departure times from the starting location in the first leg. Each departure time in the sequence is the latest departure time from the starting location in order to make a temporally feasible and independent transit trip to the destination during the time period used to compute the window group.

In some embodiments a mapping service that runs on one or more dedicated servers performs the process and stores the results to be sent to the map application or returns the results in real time (i.e., upon a request) to the map application. In some other embodiments, the process is performed by a map application that executes on a device. In some embodiments because of the high temporal variability and combinatorial complexity involved in pre-computing transit routes' schedules (frequencies), the map application and/or dedicated servers compute the transit frequency on demand only. That is, a mapping service, or one or more dedicated servers that are designated for computing departure frequencies, compute the overall transit frequency for a transit route only when they receive a request for such from a map application.

Figure 11:
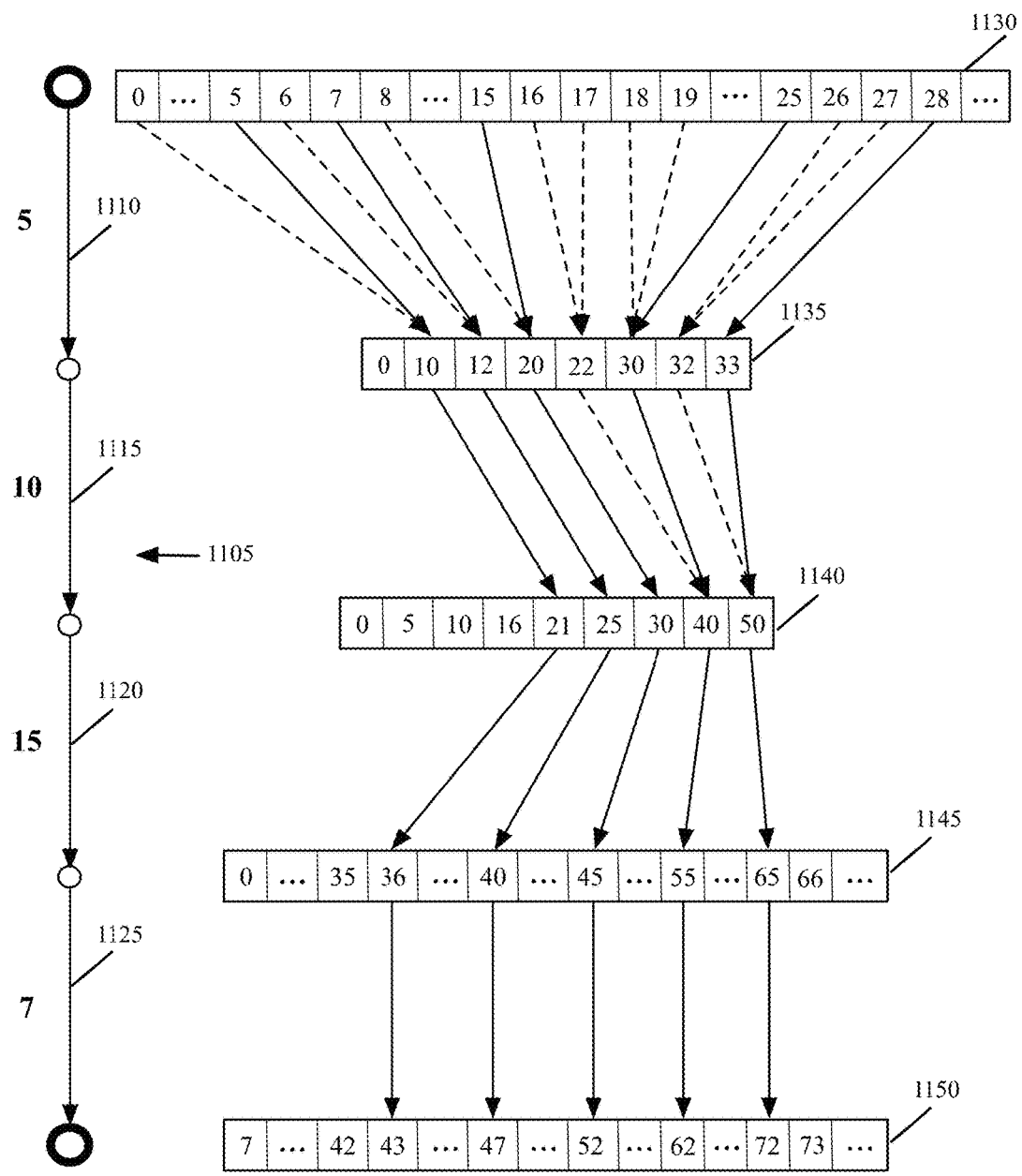
FIG. 11 provides an example for calculating a sequence of departures (i.e., a window group) that includes the departure times from the current position of the device.

The process 1000 will be described by reference to FIG. 11, which provides an example for calculating a sequence of departures (i.e., a window group) that includes the departure times from the current position of the device. FIG. 11 illustrates a transit route 1105 that includes four transit legs 1110-1125. The first transit leg 1110 represents a walking route from the starting location of the passenger to the first transit station. The last transit leg 1125 also represents a walking route from the last transit station to the desired destination. The second and third legs 1115 and 1120 use two different transit vehicles. The number of minutes next to each leg (on the left hand side of the figure) is the expected length of time to make the corresponding trip. For instance the trip time for the first walking leg is five minutes while the trip time for the last walking leg is seven minutes.

Some embodiments treats the walking routes as transit routes that depart every minute, thus, are unconstrained. Some such embodiments set aside a one-minute transition time at each transit station that acts as a buffer, allowing the passenger to make a feasible transition to the next leg of the transit route. These embodiments charge this transition cost to the transit duration of the previous leg in the transit route.

The process 1000 begins by receiving (at 1005) the departure schedule and transit time of each leg of a selected transit route. In the example of FIG. 11 the process receives the departure schedules 1130-1145 which are sequences of numbers that represent the departure times from the source of the corresponding legs 1110-1125. As stated above, the pedestrian legs are treated as transit routes that depart every minute, hence the departure schedules 1130 and 1145 include departure times that occur every minute at the source of the corresponding pedestrian leg. Additionally, the numbers in the last sequence 1150 represent the arrival times at the destination using the last walking leg.

The process 1000 then stores (at 1010) the departure times of the first leg (i.e., schedule 1130) as the possible departure times of the route. That is the departure times of the first leg are initially stored by the process as a potential sequence of departure times that could be the latest departure times from the starting location in order to make a temporally feasible transit trip to the destination. In the illustrated example, therefore, the sequence 1130 is stored as the potential departure times.

Next, the process selects (at 1015) the first leg as the current leg to process. The process then identifies (at 1020), for each feasible departure of the next leg, the latest departure time of the current leg that would allow the passenger to arrive at the next leg by that departure time. In other words determines what departure time in the current leg would be the latest time that the passenger can depart from the source of the current leg in order to catch a particular one of the departure times of the next leg. Therefore, in the example of FIG. 11, the process identifies departure time minute 5 in the first leg as the latest time in order to catch the departure time minute 10 in the second leg. This is because the passenger has to walk for 5 minutes (i.e., the transit time for the first leg) in order to get to the starting transit station of the second leg.

Similarly, the process identifies departure time minute 7 in the first leg as the latest time in order to catch the departure time minute 12 in the second leg, departure time minute 15 in the first leg as the latest time for the departure time minute 20 in the second leg, departure time minute 17 as the latest time for minute 22, departure time minute 25 as the latest time for minute 30, departure time minute 27 as the latest time for minute 32, and finally the departure time minute 28 as the latest time to catch the departure time minute 33 in the second leg.

After identifying the latest departure time in the current leg for each feasible departure time in the next leg, the process 1000 stores (at 1030), for each identified departure time, a path (link) from the identified departure time in the current leg to its corresponding feasible departure time in the next leg. In the example of FIG. 11, the process stores a path (link) from minute 5 in the first leg (which is the current leg when processing the first leg), to its correspond departure time in the second leg which is minute 10. Similarly, the process stores paths (links) from minute 7 of the first leg to minute 12 of the second leg, from minute 15 to minute 20, from minute 17 to minute 22, from minute 25 to minute 30, from minute 27 to minute 32, and finally from minute 28 to minute 33.

The process then determines (at 1040) whether the next leg for processing is the last leg of the transit trip. If the process determines that next leg for processing is not the last leg of the transit route, the process selects (at 1045) the next leg as the current leg for processing and returns to 1020 to identify the latest departure times for that leg. In the example of FIG. 11, the process determines that there are more legs to process and therefore selects the second leg as the current leg to process. The process then identifies minute 10 as the latest departure time in the second leg to catch the departure time minute 21 in the third leg.

This is because the trip time of the second leg is 10 minutes and thus the first departure time in the second leg (minute 10) can catch the departure time minute 21 in the third leg. Similarly, the process identifies departure time minute 12 in the second leg as the latest time to catch the departure time minute 25 in the second leg, departure time minute 20 as the latest time for minute 30, departure time minute 30 as the latest time for minute 40, and finally the departure time minute 33 as the latest time to catch the departure time minute 50 in the second leg. The process then stores a path from each identified departure of the second leg to its corresponding departure time in the third leg.

That is, the process stores a path between minute 10 of the second leg and minute 21 of the third leg, between minute 12 of the second leg and minute 25 in the third leg, between minute 20 of the second leg and minute 30 of the third leg, between minute 30 of the second leg and minute 40 of the third leg, and finally between minute 33 of the second leg and minute 50 of the third leg. The process iteratively performs these steps until the last leg of the transit route is also processed. After processing the last leg (i.e., the second to last leg in the transit route), the process has stored, for each identified departure time of the first leg, a path that starts from the first leg and either reaches a departure time in the last leg or ends somewhere in between. That is, after storing all the paths (links), there might be some links that do not connect any identified departure times of the first leg to any feasible departure time of the last leg.

When the process 1000 determines (at 1040) that the it has reached the last leg of the transit route, the process removes (at 1045) the departure times of the first leg that do not have a unique path to a feasible departure time in the last leg. In other words, the process examines the paths that it has stored (at 1030) for each identified departure time of each leg. If the process can connect the paths from each identified departure time in the first leg to make a unique path from the first leg to the last leg, the process keeps that departure time of the first leg, otherwise the process removes the departure time from the list of identified departure times of the first leg.

In the example of FIG. 11, the process starts with the minute 5 of the first leg, which was identified as a potential transit departure time. By examining the stored paths, the process realizes that minute 5 of the first leg is linked to minute 10 of the second leg, which in turn is linked to minute 21 of the third leg, and minute 21 of the third leg is linked to minute 36 of the last leg. Therefore the process determines that there is a direct path (link) between minute 5 of the first leg and minute 36 of the last leg. The same determination is made for minutes 7, 15, 27, and 27. However, for minute 17, the process determines that there is a link between minute 17 of the first leg and minute 22 of the second leg, but the link is disrupted there and there is no more links to the third leg from the minute 22 of the second leg.

Consequently the process removes departure time minute 17 from the first leg, hence the link from this departure time to the next leg is shown with dashed line instead of a solid line. The process also determines that there is not a unique link from minute 27 of the first leg to any departure time of the last leg and therefore it is removed from the first leg as well. As a result, the remaining departure times in the first leg, after removal of non-linked departure times in the list of identified departure times of the first leg, will be departure times 5, 7, 15, 27, and 28 which are shown in the figure as connected to the next leg with a solid ling.

The process then uses (at 1050) the remaining departure times of the first leg (i.e., departure times 5, 7, 15, 27, and 28) as the departure times of the transit route. Specifically, the process of some embodiments uses the remaining sequence as a window group for the transit route and calculates (at 1055) the transit route's departure frequency based on this window group. The process of some embodiments calculates the departure frequency by using the window group as an input for the process described above by reference to FIG. 7 in order to generate the transit route's frequency. The process then ends. As stated above, each departure time in this window group would be the latest departure time from the starting location (i.e., the current location of the passenger) in order to make a transit trip to the destination during the time period used to generate the window group.

Some embodiments perform variations of the process 1000. The specific operations of the process 1000 may not be performed in the exact order shown and described. Additionally, the specific operations may not be performed in one continuous series of operations, and different specific operations may be performed in different embodiments. For example, in some embodiments, the process returns the generated window group (the remaining transit routes in the sequence) to the map application. The map application of some such embodiments then displays the sequence to the user so the user would know when to leave the current location to be able to catch the transit vehicles of a particular transit route. The user could also easily determine the time of arrival at the destination if the user takes a particular transit route that departs at one of the identified departure times of the first leg.

For example, in the above described FIG. 11, a user by looking at the departure sequence would realize that if the user starts his trip at minute 5 (e.g., 5 minutes after the current time), the user would be able to board a transit vehicle at the first transit station at minute 10, board a transit vehicle at the second transit station at minute 21, and arrive at the destination at minute 43. Similarly, if the user starts his trip at minute 28, the user would be able to board a transit vehicle at the first transit station at minute 33, board a transit vehicle at the second transit station at minute 50, and arrive at the destination at minute 72.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 12:
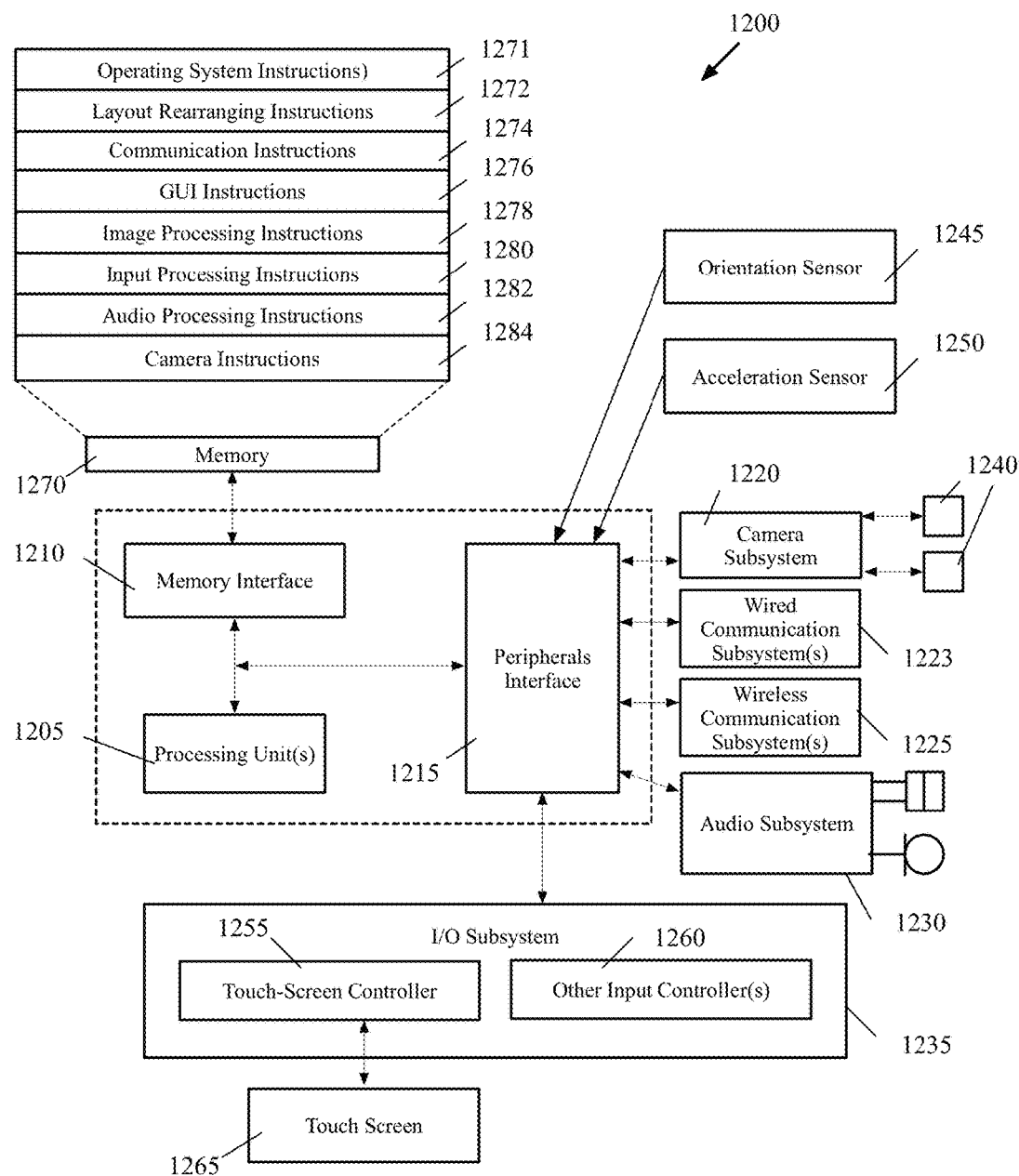
FIG. 12 illustrates an example of an architecture of a mobile computing device of some embodiments.

The applications of some embodiments operate on mobile devices, such as smart phones (e.g., iPhones®) and tablets (e.g., iPads®). FIG. 12 illustrates an example of an architecture 1200 of such a mobile computing device. As shown, the mobile computing device 1200 includes one or more processing units 1205, a memory interface 1210 and a peripherals interface 1215.

The peripherals interface 1215 is coupled to various sensors and subsystems, including a camera subsystem 1220, a wired communication subsystem(s) 1223, a wireless communication subsystem(s) 1225, an audio subsystem 1230, an I/O subsystem 1235, etc. The peripherals interface 1215 enables communication between the processing units 1205 and various peripherals. For example, an orientation sensor 1245 (e.g., a gyroscope) and an acceleration sensor 1250 (e.g., an accelerometer) is coupled to the peripherals interface 1215 to facilitate orientation and acceleration functions.

The camera subsystem 1220 is coupled to one or more optical sensors 1240 (e.g., a charged coupled device (CCD) optical sensor, a complementary metal-oxide-semiconductor (CMOS) optical sensor, etc.). The camera subsystem 1220 coupled with the optical sensors 1240 facilitates camera functions, such as image and/or video data capturing. The wired communication subsystem 1223 and wireless communication subsystem 1225 serve to facilitate communication functions.

In some embodiments, the wireless communication subsystem 1225 includes radio frequency receivers and transmitters, and optical receivers and transmitters (not shown in FIG. 12). These receivers and transmitters of some embodiments are implemented to operate over one or more communication networks such as a GSM network, a Wi-Fi network, a Bluetooth network, etc. The audio subsystem 1230 is coupled to a speaker to output audio (e.g., to output voice navigation instructions). Additionally, the audio subsystem 1230 is coupled to a microphone to facilitate voice-enabled functions in some embodiments.

The I/O subsystem 1235 involves the transfer between input/output peripheral devices, such as a display, a touch screen, etc., and the data bus of the processing units 1205 through the peripherals interface 1215. The I/O subsystem 1235 includes a touch-screen controller 1255 and other input controllers 1260 to facilitate the transfer between input/output peripheral devices and the data bus of the processing units 1205. As shown, the touch-screen controller 1255 is coupled to a touch screen 1265. The touch-screen controller 1255 detects contact and movement on the touch screen 1265 using any of multiple touch sensitivity technologies. The other input controllers 1260 are coupled to other input/control devices, such as one or more buttons. Some embodiments include a near-touch sensitive screen and a corresponding controller that can detect near-touch interactions instead of or in addition to touch interactions.

The memory interface 1210 is coupled to memory 1270. In some embodiments, the memory 1270 includes volatile memory (e.g., high-speed random access memory), non-volatile memory (e.g., flash memory), a combination of volatile and non-volatile memory, and/or any other type of memory. As illustrated in FIG. 12, the memory 1270 stores an operating system (OS) 1271. The OS 1271 includes instructions for handling basic system services and for performing hardware dependent tasks. The memory 1270 additionally includes layout rearranging instructions 1272 in order for the device 1200 to perform the layout rearranging process of some embodiments. In some embodiments, these instructions 1272 may be a subset of the operating system instructions 1271, or may be part of the instructions for an application.

The memory 1270 also includes communication instructions 1274 to facilitate communicating with one or more additional devices (e.g., for peer-to-peer data sharing, or to connect to a server through the Internet for cloud-based data sharing); graphical user interface instructions 1276 to facilitate graphic user interface processing; image processing instructions 1278 to facilitate image-related processing and functions; input processing instructions 1280 to facilitate input-related (e.g., touch input) processes and functions; audio processing instructions 1282 to facilitate audio-related processes and functions; and camera instructions 1284 to facilitate camera-related processes and functions. The instructions described above are merely exemplary and the memory 1270 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 12 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 12 may be split into two or more integrated circuits.

B. Computer System

Figure 13:
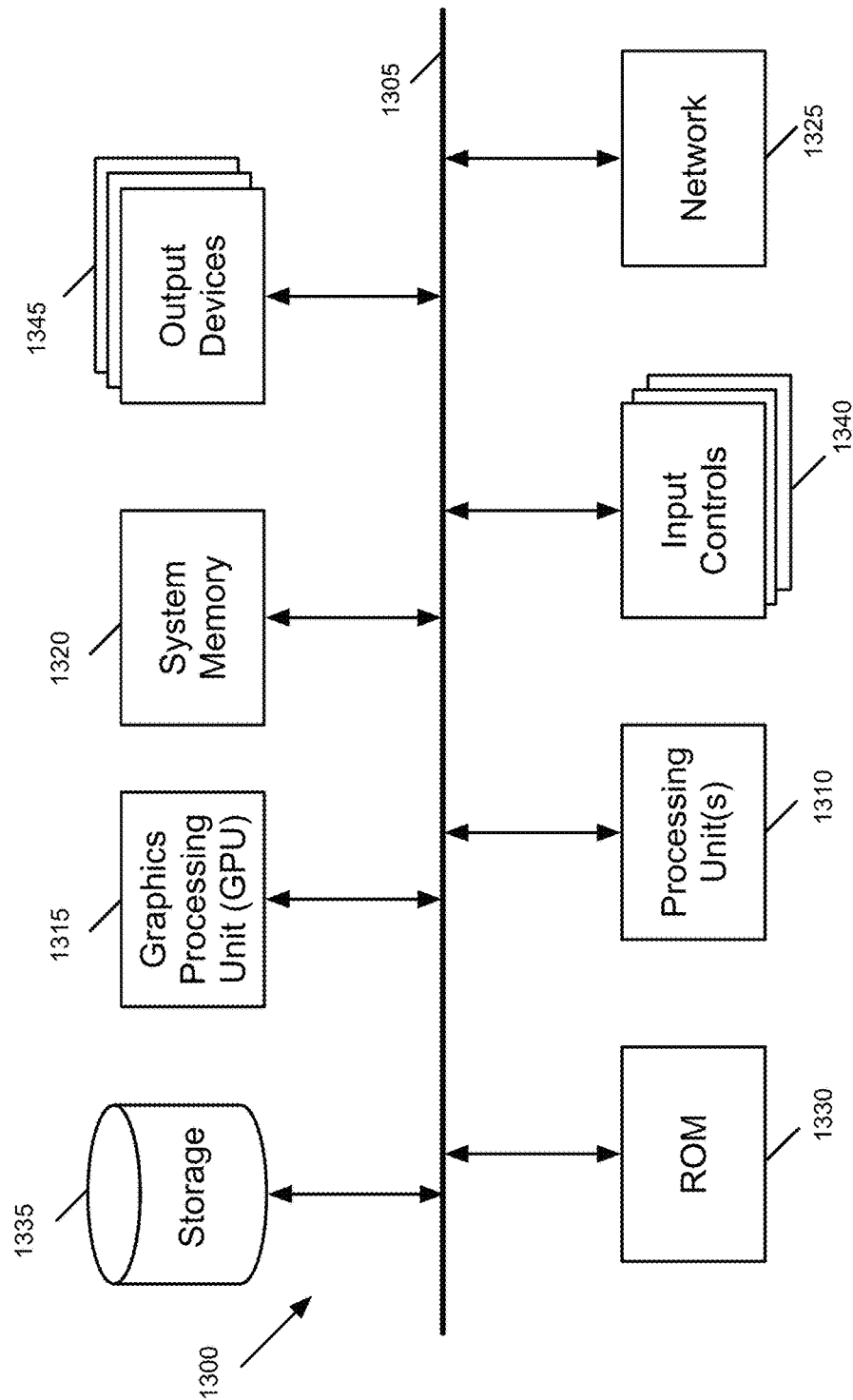
FIG. 13 conceptually illustrates another example of an electronic system with which some embodiments of the invention are implemented.

FIG. 13 conceptually illustrates another example of an electronic system 1300 with which some embodiments of the invention are implemented. The electronic system 1300 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1300 includes a bus 1305, processing unit(s) 1310, a graphics processing unit (GPU) 1315, a system memory 1320, a network 1325, a read-only memory 1330, a permanent storage device 1335, input devices 1340, and output devices 1345.

The bus 1305 collectively represents all system, peripheral, and chipset buses that communicatively connect the numerous internal devices of the electronic system 1300. For instance, the bus 1305 communicatively connects the processing unit(s) 1310 with the read-only memory 1330, the GPU 1315, the system memory 1320, and the permanent storage device 1335.

From these various memory units, the processing unit(s) 1310 retrieves instructions to execute and data to process in order to execute the processes of the invention. The processing unit(s) may be a single processor or a multi-core processor in different embodiments. Some instructions are passed to and executed by the GPU 1315. The GPU 1315 can offload various computations or complement the image processing provided by the processing unit(s) 1310. In some embodiments, such functionality can be provided using CoreImage's kernel shading language.

The read-only-memory (ROM) 1330 stores static data and instructions that are needed by the processing unit(s) 1310 and other modules of the electronic system. The permanent storage device 1335, on the other hand, is a read-and-write memory device. This device is a non-volatile memory unit that stores instructions and data even when the electronic system 1300 is off. Some embodiments of the invention use a mass-storage device (such as a magnetic or optical disk and its corresponding disk drive, integrated flash memory) as the permanent storage device 1335.

Other embodiments use a removable storage device (such as a floppy disk, flash memory device, etc., and its corresponding drive) as the permanent storage device. Like the permanent storage device 1335, the system memory 1320 is a read-and-write memory device. However, unlike storage device 1335, the system memory 1320 is a volatile read-and-write memory, such a random access memory. The system memory 1320 stores some of the instructions and data that the processor needs at runtime. In some embodiments, the invention's processes are stored in the system memory 1320, the permanent storage device 1335, and/or the read-only memory 1330. For example, the various memory units include instructions for processing multimedia clips in accordance with some embodiments. From these various memory units, the processing unit(s) 1310 retrieves instructions to execute and data to process in order to execute the processes of some embodiments.

The bus 1305 also connects to the input and output devices 1340 and 1345. The input devices 1340 enable the user to communicate information and select commands to the electronic system. The input devices 1340 include alphanumeric keyboards and pointing devices (also called "cursor control devices"), cameras (e.g., webcams), microphones or similar devices for receiving voice commands, etc. The output devices 1345 display images generated by the electronic system or otherwise output data. The output devices 1345 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 13, bus 1305 also couples electronic system 1300 to a network 1325 through a network adapter (not shown). In this manner, the computer can be a part of a network of computers (such as a local area network ("LAN"), a wide area network ("WAN"), or an Intranet), or a network of networks, such as the Internet. Any or all components of electronic system 1300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures (including FIGS. 2, 7, and 10) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

V. Map Service

Figure 14:
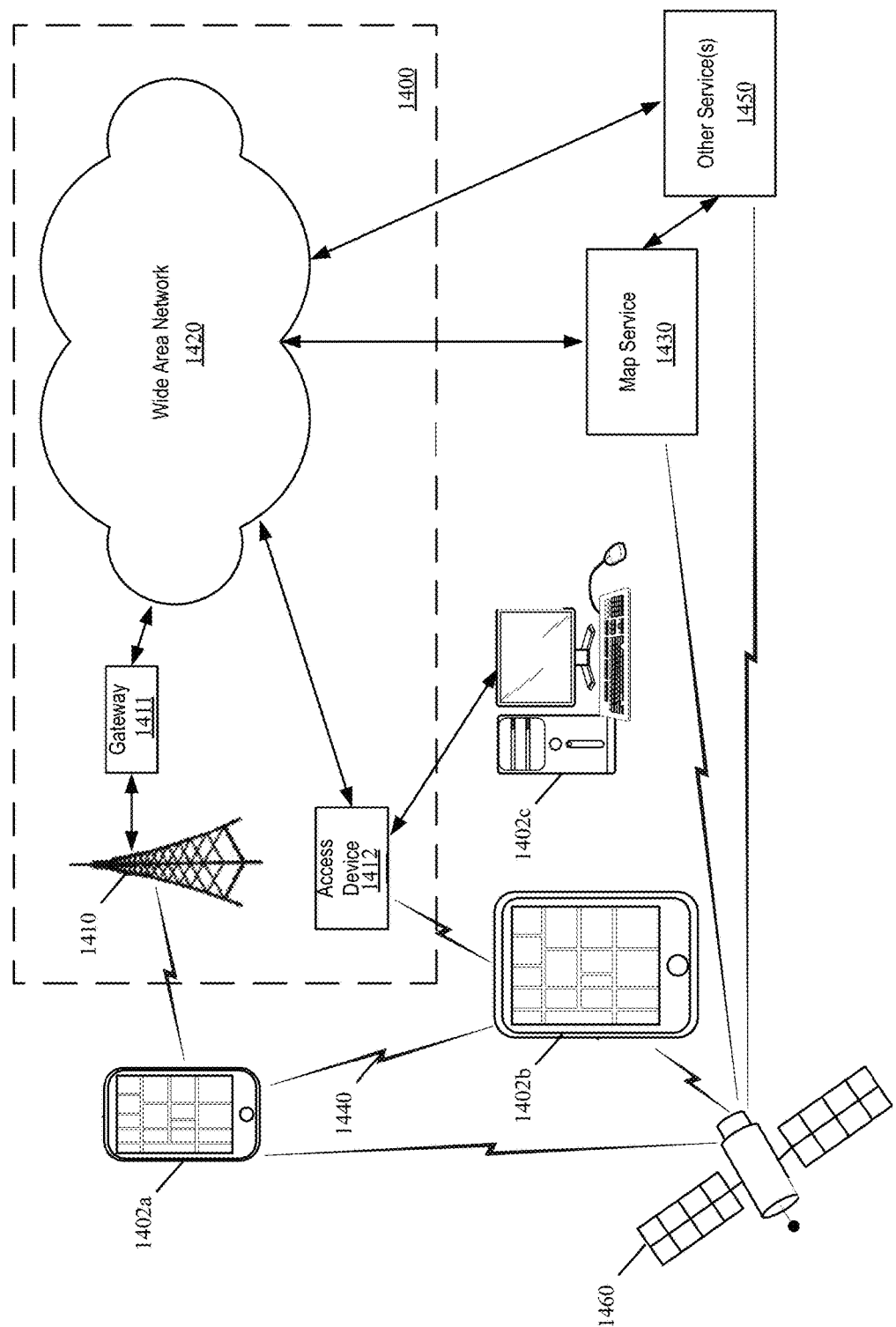
FIG. 14 illustrates one possible embodiment of an operating environment for a map service (also referred to as a mapping service) and client devices.

Various embodiments may operate within a map service operating environment. FIG. 14 illustrates one possible embodiment of an operating environment 1400 for a map service (also referred to as a mapping service) 1430 and client devices 1402a-1402c. In some embodiments, devices 1402a, 1402b, and 1402c communicate over one or more wired or wireless networks 1410. For example, wireless network 1410, such as a cellular network, can communicate with a wide area network (WAN) 1420, such as the Internet, by use of gateway 1414. A gateway 1414 in some embodiments provides a packet oriented mobile data service, such as General Packet Radio Service (GPRS), or other mobile data service allowing wireless networks to transmit data to other networks, such as wide area network 1420. Likewise, access device 1412 (e.g., IEEE 802.11g wireless access device) provides communication access to WAN 1420.

The client devices 1402a and 1402b can be any portable electronic or computing device capable of communicating with a map service (e.g., smart phone, tablet, laptop computer, etc.). Device 1402c can be any non-portable electronic or computing device capable of communicating with a map service (e.g., desktop computer, etc.). These devices may be multifunction devices capable of various functions (e.g., placing phone calls, sending electronic messages, producing documents, etc.). Though the devices 1402a-1402c are not shown as each accessing the map service 1430 via either the wireless network 1410 and gateway 1414 or the access device 1412, one of ordinary skill in the art will recognize that the client devices of some embodiments may access the map service via multiple different wired and/or wireless protocols.

Devices 1402a-1402c can also establish communications by other means. For example, these devices may communicate with other wireless devices (e.g., other devices 1402b, cell phones, etc.) over the wireless network 1410 or through access device 1412. Likewise the devices 1402a-1402c can establish peer-to-peer communications 1440 (e.g., a personal area network) by use of one or more communication subsystems, such as Bluetooth® communication or similar peer-to-peer protocols.

Devices 1402a-1402c may also receive Global Positioning Satellite (GPS) signals from GPS satellites 1460. In addition, in some embodiments the map service 1430 and other services 1450 may also receive GPS signals from GPS satellites 1460.

A map service 1430 may provide map services for one or more client devices 1402a-1402c in communication with the map service 1430 through various communication methods and protocols. A map service 1430 in some embodiments provides map information (e.g., map tiles used by the client devices to generate a two-dimensional or three-dimensional map presentation) and other map-related data, such as two-dimensional map image data (e.g., aerial view of roads utilizing satellite imagery), three-dimensional map image data (e.g., traversable map with three-dimensional features, such as buildings), route and direction calculations (e.g., driving route data, ferry route calculations, directions between two points for a pedestrian, etc.), real-time navigation data (e.g., turn-by-turn visual navigation data in two or three dimensions), traffic data, location data (e.g., where the client device currently is located), and other geographic data (e.g., wireless network coverage, weather, traffic information, or nearby points-of-interest). In various embodiments, the map service data may include localized labels for different countries or regions. Localized labels may be utilized to present map labels (e.g., street names, city names, points of interest) in different languages on client devices. The client devices 1402a-1402c may utilize these map services to obtain the various map service data, then implement various techniques to process the data and provide the processed data to various entities (e.g., internal software or hardware modules, display screens of the client devices, external display screens, or other external systems or devices.

The map service 1430 of some embodiments provides map services by generating and distributing the various types of map service data listed above, including map information used by the client device to generate and display a map presentation. In some embodiments, the map information includes one or more map tiles. The map tiles may include raster image data (e.g., bmp, gif, jpg/jpeg/, png, tiff, etc. data) for display as a map presentation. In some embodiments, the map tiles provide vector-based map data, with the map presentation data encoded using vector graphics (e.g., svg or drw data). The map tiles may also include various other information pertaining to the map, such as metadata. Some embodiments also encode style data (e.g., used to generate textures) into the map tiles. The client device processes (e.g., renders) the vector and/or raster image data to generate a map presentation for display as a two-dimensional or three-dimensional map presentation. To transmit the map tiles to a client device 1402a-1402c, the map service 1430 of some embodiments, performs various optimization techniques to analyze a map tile before encoding the tile.

In some embodiments, the map tiles are generated by the map service 1430 for different possible display resolutions at the client devices 1402a-1402c. In some embodiments, the higher zoom levels may include more detail (e.g., more street level information, etc.). On the other hand, map tiles for lower zoom levels may omit certain data (e.g., the street level details would not be used when displaying the entire earth).

To generate the map information (e.g., map tiles), the map service 1430 may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

In some embodiments, the map service 1430 responds to requests from the client devices 1402a-1402c for map information. The client devices may request specific portions of a map, or specific map tiles (e.g., specific tiles at specific zoom levels). In some embodiments, the client devices may provide the map service with starting locations (or current locations) and destination locations for a route calculations, and request turn-by-turn navigation data. A client device may also request map service rendering information, such as map textures or style sheets. Requests for other geographic data may include, but are not limited to, current location, wireless network coverage, weather, traffic information, or nearby points-of-interest.

The client devices 1402a-1402c that obtain map service data from the map service 1430 and render the data to display the map information in two-dimensional and/or three-dimensional views. Some embodiments display a rendered map and allow a user, system, or device to provide input to manipulate a virtual camera for the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. Other input devices to the client device may be used including, e.g., auditory input (e.g., spoken words), a physical keyboard, mouse, and/or a joystick. Some embodiments provide various visual feedback to virtual camera manipulations, such as displaying an animation of possible virtual camera manipulations when transitioning from two-dimensional map views to three-dimensional map views.

In some embodiments, a client device 1402a-1402c implements a navigation system (e.g., turn-by-turn navigation), which may be part of an integrated mapping and navigation application. A navigation system provides directions or route information, which may be displayed to a user. As mentioned above, a client device may receive both map image data and route data from the map service 1430. In some embodiments, the navigation feature of the client device provides real-time route and direction information based upon location information and route information received from a map service and/or other location system, such as a Global Positioning Satellite (GPS) system. A client device may display map image data that reflects the current location of the client device and update the map image data in real-time. The navigation features may provide auditory or visual directions to follow a certain route, and some embodiments display map data from the perspective of a virtual camera biased toward the route destination during turn-by-turn navigation.

The client devices 1402a-1402c of some embodiments implement various techniques to utilize the received map service data (e.g., optimized rendering techniques). In some embodiments, a client device locally stores some of the information used to render map data. For instance, client devices may store style sheets with rendering directions for image data containing style identifiers, common image textures (in order to decrease the amount of map image data transferred from the map service), etc. The client devices of some embodiments may implement various techniques to render two-dimensional and three-dimensional map image data, including, e.g., generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data.

In various embodiments, map service 1430 and/or other service(s) 1450 are configured to process search requests from any of the client devices. Search requests may include but are not limited to queries for businesses, addresses, residential locations, points of interest, or some combination thereof. Map service 1430 and/or other service(s) 1450 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 1430 and/or other service(s) 1450 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 1430 and/or other service(s) 1450, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 1430 and/or other service(s) 1450 provide one or more feedback mechanisms to receive feedback from client devices 1402a-1402c. For instance, client devices may provide feedback on search results to map service 1430 and/or other service(s) 1450 (e.g., feedback specifying ratings, reviews, temporary or permanent business closures, errors etc.); this feedback may be used to update information about points of interest in order to provide more accurate or more up-to-date search results in the future. In some embodiments, map service 1430 and/or other service(s) 1450 may provide testing information to the client device (e.g., an A/B test) to determine which search results are best. For instance, at random intervals, the client device may receive and present two search results to a user and allow the user to indicate the best result. The client device may report the test results to map service 1430 and/or other service(s) 1450 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, many of the figures illustrate various touch gestures. However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. One of ordinary skill in the art would understand that the invention is not to be limited by the foregoing illustrative details, but rather is to be defined by the appended claims.

What is claimed is:

1. A non-transitory machine readable medium storing a map application executable by at least one processing unit of a device, the application comprising sets of instructions for:
    identifying a transit route between a starting location and a destination, the transit route comprising a set of transit legs each of which serviced by transit vehicles, each transit vehicle being associated with one of a plurality of transit lines;
    categorizing each transit line as one of a high frequency transit line and a low frequency transit line by determining whether transit vehicles of each transit line depart at least once during a predetermined period of time; and
    based on the categorization, displaying departure schedules of high frequency transit lines in a frequency of departure format while displaying departure schedules of low frequency transit lines in an absolute time format.

2. The non-transitory machine readable medium of claim 1, wherein the set of instructions for categorizing a transit line comprises a set of instructions for categorizing the transit line based on a number of departures of transit vehicles of the transit line from a first transit station of a transit leg that is serviced by the transit line.

3. The non-transitory machine readable medium of claim 2, wherein the first transit station of the transit leg comprises a transit station from which the transit leg starts.

4. The non-transitory machine readable medium of claim 2, wherein the set of instructions for categorizing the transit line further comprises a set of instructions for categorizing the transit line as a high frequency transit line when the transit vehicles of the transit line depart from the first transit station on average more than once during a predetermined period of time.

5. The non-transitory machine readable medium of claim 4, wherein the set of instructions for displaying the departure schedule of the high frequency transit line comprises a set of instructions for displaying a time interval between each pair of departures of the transit vehicles of the transit line from the first station.

6. The non-transitory machine readable medium of claim 5, wherein the set of instructions for displaying the time interval comprises a set of instructions for displaying one of an exact time, an approximate time, and a time range.

7. The non-transitory machine readable medium of claim 2, wherein the set of instructions for categorizing the transit line further comprises a set of instructions for categorizing the transit line as a low frequency transit line when the transit vehicles of the transit line do not depart from the first transit station on average more than once during a predetermined period of time.

8. The non-transitory machine readable medium of claim 7, wherein the set of instructions for displaying a departure schedule of the low frequency transit line comprises a set of instructions for displaying a particular time for starting a transit trip using the transit route.

9. The non-transitory machine readable medium of claim 8, wherein the application further comprises a set of instructions for tracking a current location of the device, wherein the set of instructions for displaying the particular time comprises a set of instructions for displaying the particular time for starting the transit trip differently based on the current location of the device.

10. The non-transitory machine readable medium of claim 9, wherein the set of instructions for displaying the particular time for starting the transit trip comprises a set of instructions for displaying the particular time as a departure time of a next transit vehicle of the transit line when the current location of the device is at or inside a threshold vicinity of the first transit station.

11. The non-transitory machine readable medium of claim 10, wherein the set of instructions for displaying the particular time for starting the transit trip comprises a set of instructions for displaying the particular time as a time to leave the current location of the device when the current location of the device is outside the threshold vicinity of the first transit station.

12. The non-transitory machine readable medium of claim 11, wherein the time to leave the current location is calculated based on a walking distance between the current location of the device and the first transit station.

13. The non-transitory machine readable medium of claim 1, wherein the set of instructions for categorizing each transit line comprises sets of instructions for:
    sending the identified transit route to a set of servers; and
    receiving from the server set the identified transit route with each transit line categorized as one of a high frequency transit line and a low frequency transit line.

14. The non-transitory machine readable medium of claim 1, wherein the displayed departure schedules include a travel time of the transit route.

15. An electronic device comprising:
a set of processing units for executing sets of instructions; and
a non-transitory machine readable medium storing a map application executable by at least one of the processing units of the device, the application comprising sets of instructions for:
identifying a transit route between a starting location and a destination, the transit route comprising a set of transit legs each of which serviced by transit vehicles, each transit vehicle being associated with one of a plurality of transit lines;
categorizing each transit line as one of a high frequency transit line and a low frequency transit line by determining whether transit vehicles of each transit line depart at least once during a predetermined period of time; and
based on the categorization, displaying departure schedules of high frequency transit lines in a frequency of departure format while displaying departure schedules of low frequency transit lines in an absolute time format.

16. The electronic device of claim 15, wherein the set of instructions for displaying the departure schedules comprises a set of instructions for displaying a departure schedule of a transit line in a navigation banner that comprises navigation instructions for a transit leg that is serviced by the transit line.

17. The electronic device of claim 16, wherein the navigation banner is one of a plurality of navigation banners that are displayed to a user during a transit navigation presentation for navigating the transit route.

18. The electronic device of claim 15, wherein the set of instructions for displaying the departure schedules comprises a set of instructions for displaying a departure schedule of a particular transit line from a transit station in the transit station's placecard that comprises departure schedules of a plurality of transit lines that depart from the transit station.

19. The electronic device of claim 18, wherein the particular transit line comprises a high frequency transit line, wherein the set of instructions for displaying the departure schedule of the particular transit line comprises a set of instructions for displaying the departure schedule as a frequency of departures of transit vehicles of the particular transit line from the transit stations in the placecard.

20. The electronic device of claim 19, wherein the set of instructions for displaying the departure schedule of the particular transit line further comprises a set of instructions for displaying a countdown to an upcoming departure time of the particular transit line in addition to displaying the frequency of departures of the particular transit line.

21. The electronic device of claim 15, wherein the displayed departure schedules include a travel time of the transit route.

22. The electronic device of claim 15, wherein each transit line comprises one of a bus line, a subway line, a light rail line, and a ferry line.

* * * * *